United States Patent
Iijima et al.

(10) Patent No.: US 7,187,628 B2
(45) Date of Patent: Mar. 6, 2007

(54) EDITING DEVICE CAPABLE OF IMPARTING GROUP MANAGEMENT INFORMATION TO EACH RECORDING TRACK

(75) Inventors: Takayuki Iijima, Kawagoe (JP); Hiroshi Kobayashi, Kawagoe (JP); Katsuaki Yamanoi, Kawagoe (JP); Shinichiro Abe, Kawagoe (JP); Tomoyasu Yamada, Kawagoe (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 10/914,186

(22) Filed: Aug. 10, 2004

(65) Prior Publication Data
US 2005/0007895 A1 Jan. 13, 2005

Related U.S. Application Data

(62) Division of application No. 09/990,343, filed on Nov. 23, 2001, now Pat. No. 7,145,839.

(30) Foreign Application Priority Data

| Nov. 24, 2000 | (JP) | ............................ P2000-357767 |
| Nov. 24, 2000 | (JP) | ............................ P2000-357768 |
| Nov. 24, 2000 | (JP) | ............................ P2000-357770 |
| Nov. 24, 2000 | (JP) | ............................ P2000-357771 |

(51) Int. Cl.
*G11B 21/08* (2006.01)

(52) U.S. Cl. .................. 369/30.19; 369/30.05

(58) Field of Classification Search ............ 369/30.05, 369/30.19, 47.13, 47.12, 30.08, 30.09, 83; 386/52, 54, 57, 4; 360/13
See application file for complete search history.

(56) References Cited

U.S. PATENT DOCUMENTS

| 5,841,740 | A | 11/1998 | Fijita et al. .................... 369/32 |
| 6,172,948 | B1 * | 1/2001 | Keller et al. .................. 369/83 |
| 6,185,163 | B1 | 2/2001 | Bickford et al. .............. 369/32 |
| 6,587,404 | B1 * | 7/2003 | Keller et al. ............. 369/30.06 |
| 6,675,179 | B2 * | 1/2004 | Morohashi .................. 707/204 |
| 6,721,489 | B1 * | 4/2004 | Benyamin et al. ............ 386/46 |

(Continued)

FOREIGN PATENT DOCUMENTS

JP 2000/251486 9/2000

(Continued)

OTHER PUBLICATIONS

Information Recording Device (Japan, 2002-163875,Yamanoi et al), Jul. 6, 2002, abstract only.*

(Continued)

*Primary Examiner*—Tan Dinh
(74) *Attorney, Agent, or Firm*—Drinker Biddle & Reath LLP

(57) ABSTRACT

Management information is read from an information storage medium having the management information recorded thereon, the management information including track number information imparted to at least one track and group management information for managing as selective recording information one or a plurality of tracks as one group. Judgment is then made upon whether the group management information is included in that management information. A display mode is changed depending on a case where the group management information is recorded and a case where it is not recorded, and it is then displayed in a displaying device.

7 Claims, 20 Drawing Sheets

U.S. PATENT DOCUMENTS

| | | | |
|---|---|---|---|
| 6,915,377 B2* | 7/2005 | Hitotsui | 369/30.05 |
| 2001/0030827 A1 | 10/2001 | Morohashi | 360/69 |
| 2002/0064116 A1 | 5/2002 | Yamanoi et al. | 369/53.37 |
| 2002/0093886 A1 | 7/2002 | Ijichi et al. | 369/30.09 |

FOREIGN PATENT DOCUMENTS

| | | |
|---|---|---|
| JP | 2002-163878 | 6/2002 |
| WO | WO 99/34601 | 7/1999 |

OTHER PUBLICATIONS

Information Recording Device (Japan, 2002-163876,Yamanoi et al), Jul. 6, 2002, abstract only.*

Information Recording Device (Japan, 2002-163877,Yamanoi et al), Jul. 6, 2002, abstract only.*

* cited by examiner

FIG. 6A
| TNO. | 1 | 2 | 3 | 4 | 5 |
|---|---|---|---|---|---|
| SONG NAME | a | b | c | d | e |
FIG. 6B
| TNO. | 1 | 2 | 3 | 4 | 5 |
|---|---|---|---|---|---|
| SONG NAME | a | b | c | d | e |
FIG. 6C
| NEW TNO. | 1 | 2 | 3 | 4 | 5 |
|---|---|---|---|---|---|
| OLD TNO. | 1 | 3 | 4 | 2 | 5 |
| SONG NAME | a | c | d | b | e |
FIG. 6D
| NEW TNO. | 1 | 2 | 3 | 4 | 5 |
|---|---|---|---|---|---|
| OLD TNO. | 1 | 3 | 4 | 2 | 5 |
| SONG NAME | a | c | d | b | e |
FIG. 6E
| NEW TNO. | 1 | 2 | 3 | 4 | 5 |
|---|---|---|---|---|---|
| OLD TNO. | 4 | 1 | 3 | 2 | 5 |
| SONG NAME | d | a | c | b | e |

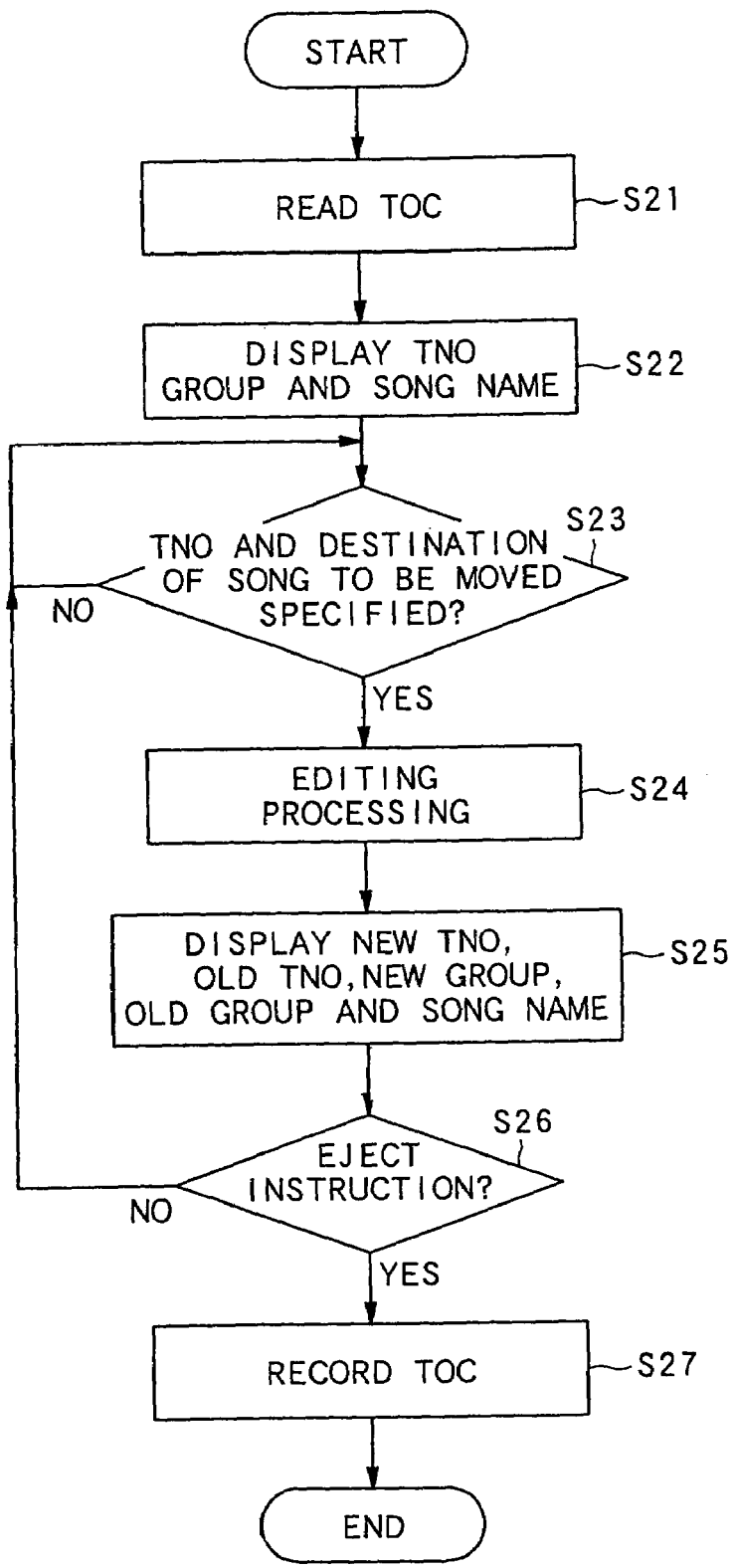

FIG. 8A
| TNO. | 1 | 2 | 3 | 4 | 5 |
|---|---|---|---|---|---|
| Group | A | A | A | B | B |
| SONG NAME | a | b | c | d | e |
FIG. 8B
| TNO. | 1 | 2 | 3 | 4 | 5 |
|---|---|---|---|---|---|
| Group | A | A | A | B | B |
| SONG NAME | a | b | c | d | e |
FIG. 8C
| NEW TNO. | 1 | 2 | 3 | 4 | 5 |
|---|---|---|---|---|---|
| NEW Group | A | A | B | B | B |
| OLD TNO. | 1 | 3 | 4 | 2 | 5 |
| OLD Group | A | A | B | A | B |
| SONG NAME | a | c | d | b | e |
FIG. 8D
| NEW TNO. | 1 | 2 | 3 | 4 | 5 |
|---|---|---|---|---|---|
| NEW Group | A | A | B | B | B |
| OLD TNO. | 1 | 3 | 4 | 2 | 5 |
| OLD Group | A | A | B | A | B |
| SONG NAME | a | c | d | b | e |
FIG. 8E
| NEW TNO. | 1 | 2 | 3 | 4 | 5 |
|---|---|---|---|---|---|
| NEW Group | A | A | A | B | B |
| OLD TNO. | 4 | 1 | 3 | 2 | 5 |
| OLD Group | B | A | A | A | B |
| SONG NAME | d | a | c | b | e |

FIG. 20A
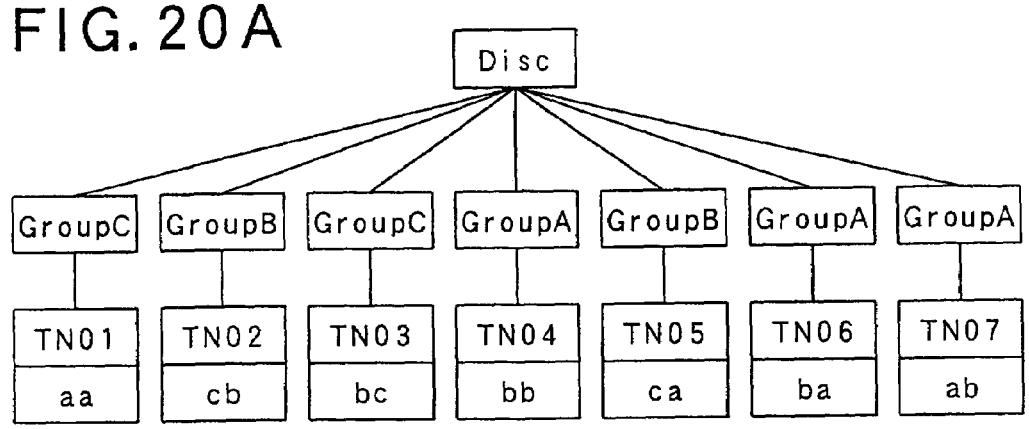
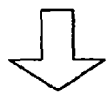
FIG. 20B
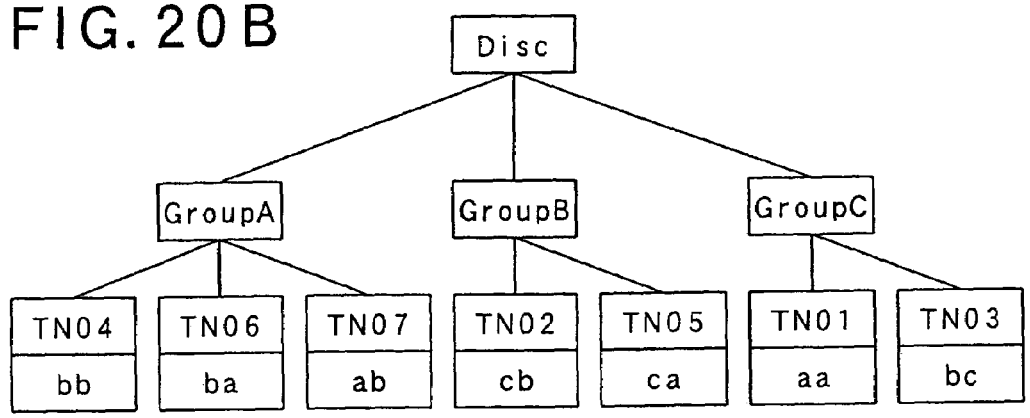
FIG. 20C
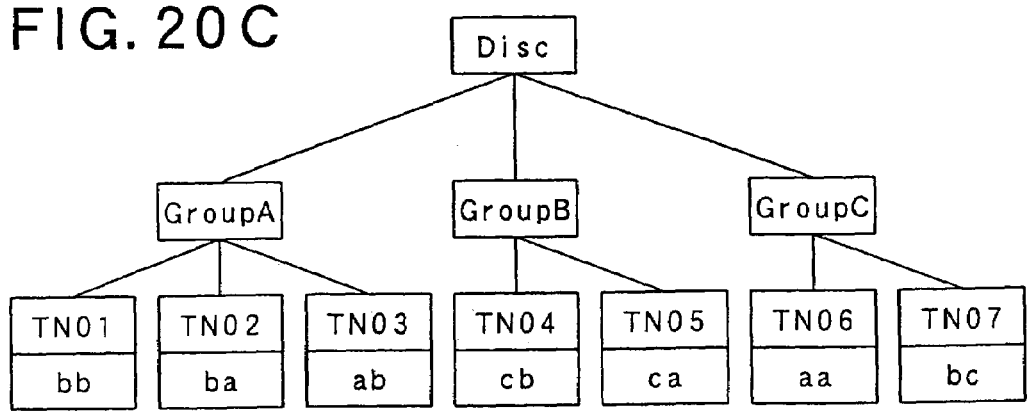

EDITING DEVICE CAPABLE OF IMPARTING GROUP MANAGEMENT INFORMATION TO EACH RECORDING TRACK

This is a divisional application of prior application Ser. No. 09/990,343, filed on Nov. 23, 2001 now U.S. Pat No. 7,145,839, which is incorporated by reference herein in its entirety.

BACKGROUND OF THE INVENTION

1. Field of the Invention

The present invention relates to an information displaying/reproducing device capable of displaying management information recorded on an information storage medium, an information editing device capable of efficiently editing the management information, and an information recording device provided with a device for imparting track number information for each track recorded on an information storage medium.

2. Description of the Related Art

As an information recording medium in which music information and image information are recorded, a tape shaped information recording medium represented by a cassette tape, a DAT (digital audio tape), 8 mm tape and the like, and a disc information recording medium represented by an LD (laser disc), a CD (compact disc), an MD (mini disc), a DVD (digital versatile disc) and the like are known.

In recent years, writing and rewriting of information have been made possible in the disc information recording medium, and it has been remarkably spread combined with an advantage of quick access to the recorded information.

When music (hereinafter, simply described as "tune") is recorded in the disc information recording medium, one tune is made to be a unit called a "track", for example, and it can be controlled by attaching track number information. Such track number information is included in control information called a TOC (Table of content) recorded in the innermost peripheral part of the disc together with information to control recording data such as a disc name, a tune name, a tune number, a total playing time, a starting position and an ending position of the tune on the disc (a starting time and an ending time in the case of controlling the position by time information) and the like. When a user reproduces a recorded song, he/she can operate the recording/reproducing editing apparatus for a disc and select a recorded song by specifying such track number information. Such management information is displayed on, e.g., a display unit of the disc recording/reproducing device. Further, in case of reproducing a recorded song, the user can select the recorded song by specifying track number information displayed on the display unit or a song name.

Meanwhile, with improvement in the information recording density to the disc type information storage medium or establishment of a new information compression mode, a number of songs which can be recorded on one disc type information storage medium can be outstandingly increased. For example, in case of the MD, there has been conventionally adopted an information compression mode called ATRAC (Adaptive Transform Acoustic Coding). In recent years, however, an MDLP standard for performing information recording by an information compression mode referred to as ATRAC3 having the twofold or fourfold compression efficiency of that of the conventional mode has been established. According to this ATRAC3, in the MD whose normal recording time is 80 minutes, up to 320-minute recording is enabled in the fourfold mode. According to such a new information compression mode, even if the time of one song is approximately five minutes, approximately 60 songs can be recorded on the disc.

When a very large number of songs can be recorded in this manner, however, selecting a song displayed on the display unit takes a lot of troubles when a user reproduces a recorded song. As a countermeasure, there has been proposed a method by which a user can collect one or a plurality of songs to form a group and manage songs in accordance with each group (which will be referred to as "group management" hereinafter). In such group management, information such as the same group name is given to songs belonging to the same group, and the information such as a group name is recorded at the innermost circumference portion of the disc as group management information together with the track number information. Furthermore, for example, when the disc is inserted into a disc recording/reproducing device, the group management information is read from the disc and displayed in a group selection screen of the display unit. When a user specifies a desired group on the group selection screen, a screen for selecting a song belonging to that group or the like is displayed. Therefore, since the user can first specify a desired group and then select a song belonging to that group, a song can be efficiently selected.

If a number of songs to be recorded is small, however, it is not necessary to venture to conduct group management, and whether group management is performed is decided by a selection of a user. Therefore, both a disc on which the group management information is recorded and a disc having no such information recorded thereon exist, and it can be considered that judgment must be rapidly made upon whether it is a disc under group management. Moreover, for example, when a disc having the group management information recorded thereon is inserted into the disk recording/reproducing device, it can be considered that the group selection screen displaying no group management information is displayed. In such a case, a user must perform the unproductive operation, namely, switching to another screen each time.

In addition, when a very large number of songs can be recorded in this way, it is extremely difficult for a user to memorize the correspondence relationship of the track number information and songs Therefore, when editing a reproduction order of songs or the like, a user gets confused, resulting in excessive operation loads.

Additionally, when a very large number of songs can be recorded in this manner, decision on a recording order of songs or management of recorded songs becomes very troublesome. For example, in case of dubbing songs in various genres (for example, rock, pops, classical and others) from a plurality of CDs to one MD, it can be usually considered that a user collects and records desired songs in accordance with each genre. At this moment, however, determining a reproduction order of respective genres or a reproduction order of songs in each genre in advance is burdensome. Further, even if recording is performed in the predetermined reproduction order of the respective genres or the predetermined reproduction order of songs, a user may thereafter possibly change the reproduction order of the respective genres or that of the songs. If such an order is changed, excessive operation loads are given to the user.

SUMMARY OF THE INVENTION

In view of the above-described problems, it is an object of the present invention to provide an information displaying/ reproducing device capable of causing a user to rapidly perceive a difference in management information recorded on an information storage medium and reducing operation loads with respect to the user.

It is another object of the present invention to provide an information displaying/reproducing device capable of reducing operation loads to a user when editing management information recorded on an information storage medium.

It is still another object of the present invention to provide an information recording device capable of efficiently managing a recorded track and reducing operation loads to a user.

The above object of the present invention can be achieved by an information displaying/reproducing apparatus is provided with: a reading device for reading management information from an information storage medium having said management information recorded thereon, said management information including track number information imparted to at least one track and group management information for managing, as a selective recording information, one or a plurality of tracks as one group; and a displaying device for displaying said read management information, wherein said information displaying/recording device further comprising a display controlling device for determining whether said group management information is recorded on said information storage medium, changing a display mode depending on a case where said group management information is recorded and a case where it is not recorded, and displaying it in said displaying device.

According to the present invention, management information is read from an information storage medium having the management information including track number information given to at least one track and group management information for managing as selective recording information one or a plurality of tracks as one group recorded thereon. Further, judgment is made upon whether the group management information exists in the management information, and a display mode is changed depending on a case where the group management information is recorded and a case where it is not recorded, and the management information is displayed in the displaying device. Therefore, a user can be caused to rapidly perceive a difference in the recorded management information, namely, whether the group management information is recorded on the information storage medium. Furthermore, even in case of the information storage medium having no group management information recorded thereon, the management information is displayed in the display mode corresponding to such an information storage medium. Thus, a user does not have to carry out the unfruitful operation, thereby reducing the operation loads to the user.

In one aspect of the present invention, when it is determined that said group management information is recorded on said information storage medium, said display controlling device creates a list of group information recorded on said information storage medium and displays it in said displaying device.

According to this aspect, when the group management information is recorded, the listed group information (for example, group name information) is displayed, and a user can hence rapidly select a group.

In another aspect of the present invention, when it is determined that said group management information is not recorded on said information storage medium, said display controlling device immediately displays said track number information recorded on said information storage medium in said displaying device.

According to this aspect, if the group management information is not recorded, since the track number information is immediately displayed in the displaying device, a user does not have to perform the unproductive operation, thereby reducing the operation loads to the user.

The above object of the present invention can be achieved by an information displaying/reproducing apparatus is provided with: a reading device for reading management information from an information storage medium having said management information recorded thereon, said management information including track number information imparted to at least one track and group management information for managing as selective recording information one or a plurality of tracks as one group; an operating device for giving a predetermined operation instruction to said information displaying/reproducing apparatus; and a function controlling device for determining whether said group management information is recorded on said information storage medium and changing an operation function mode of said operating device depending on a case where said group management information is recorded and a case where it is not recorded.

According to the present invention, the management information is read from the information storage medium having the management information recorded thereon, the management information including track number information given to at least one track and group management information for managing as selective recording information one or a plurality of tracks as one group. Moreover, judgment is made upon whether the group management information is included in the management information, and an operation function mode of the operating means is changed depending on a case where the group management information is recorded and a case where it is not recorded. Therefore, since the operation function mode of the operating means is automatically changed depending on the case where the group management information is recorded and the case where it is not recorded, a user does not have to perform the unproductive operation, thereby reducing the operation loads to the user.

The above object of the present invention can be achieved by an information displaying/reproducing apparatus for displaying track number information imparted in accordance with each track recorded on an information storage medium, wherein when a logical position of said track is changed, track number information before said change and track number information after said change are associated with each other and displayed.

According to the present invention, when a logical position of the track is changed, since the track number information before the change and the track number information after the change are associated with each other and displayed, a user can comprehend the state before the change and efficiently edit without being confused.

In one aspect of the present invention, said track number information after said change is displayed in the order of its numbers.

According to this aspect, since the track number information after the change can be displayed in the order of its numbers, it is possible to further efficiently perform editing.

The above object of the present invention can be achieved by an information displaying/reproducing apparatus for displaying track number information imparted in accordance with each track recorded on an information storage medium and group management information for managing one or a plurality of said tracks as one group, wherein when a logical position of said track is changed, track number information and group management information before said change and track number information and group management information after said change are associated with each other and displayed.

According to the present invention, when a logical position of the track is changed, since the track number information and the group management information before the change and the track number information and the group management information after the change are associated with each other and displayed, a user can comprehend the state before the change and can efficiently perform editing without being confused.

In one aspect of the present invention, said track number information after said change is displayed in the order of its numbers.

According to this aspect, since the track number information after the change is displayed in the order of its numbers, it is possible to further efficiently perform editing.

The above object of the present invention can be achieved by an information editing apparatus for editing management information to be recorded on an information storage medium, said management information including track number information imparted to one track and group management information for managing one or a plurality of said tracks as one group, wherein when an editing instruction is issued in order to change a logical position of said track belonging to one group, the correspondence relationship of said track number information and said group management information is automatically edited in accordance with a new logical position of said track.

According to the present invention, when the editing instruction is issued in order to change a logical position of a track belonging to one group, that track is changed to a specified logical position. Then, in accordance with the new logical position of the track, the correspondence relationship between the track number information and the group management information is automatically edited. That is, based on a predetermined rule according to the new logical position of the track, the correspondence relationship between the track number information and the group management information is automatically edited. Therefore, since a user himself/herself does not have to edit the correspondence relationship between the track number information and the group management information after changing the logical position of the track, the operation loads to the user can be reduced. Here, the logical position does not mean a recording position itself on the information storage medium but a relative position managed by giving the track number information or the group information (for example, group name information).

In one aspect of the present invention, said new logical position is included in an existing group which already exists, said existing group is divided into a plurality of groups.

According to this aspect, when the new logical position of the track is in the existing group which has already existed, the existing group is automatically divided, and the correspondence relationship between the track number information and the group management information is automatically edited, thereby further reducing the operation loads to a user.

In another aspect of the present invention, different sets of group information are imparted to a plurality of said groups.

According to this aspect, since the respective different sets of group information (for example, group name information) are given to a plurality of the groups, a user can efficiently specify a desired group.

In further aspect of the present invention, the same group information is imparted to a plurality of said groups.

According to this aspect, since the same group information (for example, group name information) is given to a plurality of the groups, a user can efficiently manage a desired group.

The above object of the present invention can be achieved by an information editing apparatus for editing management information to be recorded on an information storage medium, said management information including track number information imparted to one track and group management information for managing one or a plurality of said tracks as one group, wherein an editing instruction is issued in order to cause a track belonging to one group to belong to another group, track number information imparted to tracks remaining said one group is changed.

According to the present invention, when an editing instruction is issued in order that a track belonging to one group is caused to belong to another group, that track is changed so as to belong to a specified different track. Then, the track number information given to the tracks remaining in the one group is changed. Therefore, a user himself/herself does not have to change the track number information with respect to the tracks remaining in the one group, thereby reducing the operation loads to the user.

The above object of the present invention can be achieved by an information editing apparatus for editing management information to be recorded on an information storage medium, said management information including track number information imparted to one track and group management information for managing one or a plurality of said tracks as one group, wherein when an editing instruction is issued in order to cause a track belonging to one group to belong to another group, track number information imparted to said track caused to belong to said another group is changed.

According to the present invention, when an editing instruction is issued in order that a track belonging to one group is caused to belong to a different group, that track is changed to belong to a specified different track. Then, the track number information given to the track caused to belong to the different track is changed. Therefore, a user himself/herself does not have to change the track number information with respect to the track caused to belong to the different group, thereby reducing the operation loads to the user.

In one aspect of the present invention, with said editing instruction, said track number information of said track belonging to one group and group information of other groups are specified.

According to this aspect, since the track number information of the track belonging to the one group can be specified, the specified track can be efficiently caused to belong to the different group.

In another aspect of the present invention, with said editing instruction, group information of one group and group information of other groups are specified.

According to this aspect, since the group information (for example, group name information) of the one group can be specified, the track belonging to the specified group can be further efficiently (collectively) caused to belong to the different group.

The above object of the present invention can be achieved by an information editing apparatus for editing management information to be recorded on an information storage medium, said management information including track number information imparted to one track and group management information for managing one or a plurality of said tracks as one group, wherein when an editing instruction is issued in order to integrate a plurality of groups into one group, track number information imparted to a track caused to belong to said integrated group is changed.

According to the present invention, when an editing instruction is issued in order to integrate a plurality of groups into one group, a plurality of specified groups are integrated into one group. Then, the track number information given to the tracks caused to belong to the integrated group is changed. Therefore, a user himself/herself does not have to change the track number information with respect to the tracks caused to belong to the integrated group, thereby reducing the operation loads to the user.

The above object of the present invention can be achieved by an information editing apparatus for editing management information to be recorded on an information storage medium, said management information including track number information imparted to one track and group management information for managing one or a plurality of said tracks as one group, wherein when an editing instruction is issued in order to group-manage a track which is not under group management, a new group is created, said track is allocated to said created group, and a track number imparted to said track which is allocated to said new group and is not under said group management is changed.

According to the present invention, when an editing instruction is issued in order to perform group management of tracks which are not under group management, a new group is created, and the tracks which are not under the group management are allocated to the created group. Then, the track number information given to the tracks caused to belong to the new group is changed. Therefore, a user himself/herself does not have to change the track number information with respect to the tracks caused to belong to the new group, thereby reducing the operation loads to the user.

The above object of the present invention can be achieved by an information recording apparatus comprising an information imparting device for imparting track number information in accordance with each track to be recorded on an information storage medium and group information included in group management information for managing one or a plurality of tracks as one group, wherein every time one track is recorded on said information storage medium, said information imparting device imparts group information to said track.

According to the present invention, every time one track is recorded, the group information is given to that track. Therefore, a user can efficiently manage the recorded tracks based on the group information given to each track (for example, a song) after recording, thereby reducing the operation loads to the user.

In one aspect of the present invention, every time said one track is recorded, said group information imparted to said track is group information of a group which already exists on said information storage medium.

According to this aspect, a newly recorded track and tracks belonging to the already existing group can be collectively managed.

In another aspect of the present invention, every time said one track is recorded, said group information imparted to said track is group information of a new group.

According to this aspect, a newly recorded track can be managed separately from tracks belonging to the existing group.

In further aspect of the present invention, every time said one track is recorded, track number information is imparted to said track.

According to this aspect, the recorded track can be further efficiently managed by utilizing the group information and the track number information.

In further aspect of the present invention, every time said one track is recorded, group information and track number information are imparted to said track, and thereafter track number information imparted to each track is changed by utilizing said imparted group information.

According to this aspect, since the track number information is automatically re-imparted by utilizing the given group information, thereby reducing the operation loads to the user.

In further aspect of the present invention, every time said one track is recorded, group information and track number information are imparted to said track, grouping editing is then carried out so that tracks having the same imparted group information form one group, and track number information imparted to each track is changed based on said editing.

According to this aspect, since the tracks are collected and edited in accordance with the same group and the track number information is re-imparted to the tracks based on editing, a user can record the tracks without considering the order of recording for example, thereby reducing the operation loads to the user.

BRIEF DESCRIPTION OF THE DRAWINGS

FIG. 6A is a view (part 1) showing a display screen example of the display portion when the group management information is not included in the second embodiment according to the present invention, FIG. 6B is a view (part 2) showing the display screen example, FIG. 6C is a view (part 3) showing the display screen example, FIG. 6C is a view (part 4) showing the display screen example, and FIG. 6D is a view (part 5) showing the display screen example;

FIG. 7 is a flowchart showing a display processing routine at the time of TOC editing when the group management information is included in the second embodiment according to the present invention;

FIG. 8A is a view (part 1) showing a display screen example of the display portion when the group management information is included in the second embodiment according to the present invention, FIG. 8B is a view (part 2) showing the display screen example, FIG. 8C is a view (part 3) showing the display screen example, FIG. 8C is a view (part 4) showing the display screen example, and FIG. 8D is a view (part 5) showing the display screen example;

FIG. 20 is a view showing an example of a change in the logical structure of TOC in the TOC giving/editing processing according to the fourth embodiment of the present invention.

DETAILED DESCRIPTION OF THE PREFERRED EMBODIMENTS

Preferred embodiments according to the present invention will now be described with reference to the accompanying drawings. The following describes the embodiments when the information displaying/reproducing device according to the present invention is applied to a magnetic optical disc recording/reproducing device.

(First Embodiment)

Figure 1:
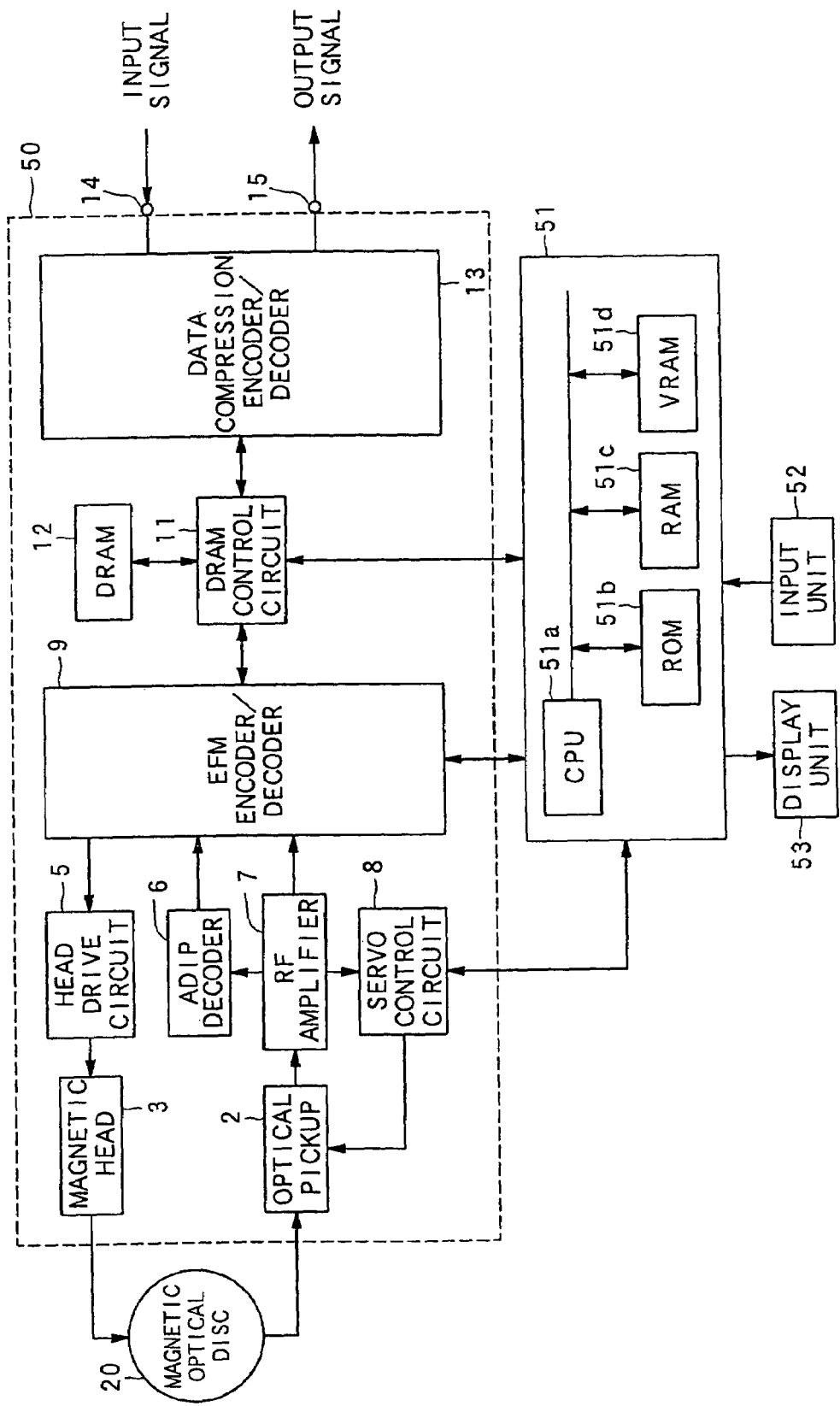
FIG. 1 is a view showing a schematic structural example of a magnetic optical disc recording/reproducing device according an embodiment of the present invention.

FIG. 1 shows a schematic structural example of a magnetic optical disc recording/reproducing apparatus according to an embodiment of the present invention. As shown in FIG. 1, the magnetic optical disc recording/reproducing apparatus 100 is configured to include an information recording/reproducing unit 50, a system controller 51, an input portion 52 and a display unit 53, and these portions are connected as shown in the drawing.

The information recording/reproducing unit 50 includes: a non-illustrated spindle motor for driving to rotate a magnetic optical disc 20; an optical pickup 2; an RF amplifier 7; an ADIP decoder 6; an EFM encoder/decoder 9; a magnetic head 3; a head drive circuit 5; a DRAM (Dynamic Random Access Memory) 12; a DRAM control circuit 11; a data compression encoder/decoder 13; and a servo control circuit 8.

The optical pickup 2 includes: a non-illustrated laser diode for emitting a laser beam; various kinds of splitters for splitting an outgoing beam from the laser diode and a reflected light ray from the magnetic optical disc 20 in accordance with each purpose; a detector for converting the reflected light from the magnetic optical disc 20 or the light split by the various kinds of splitters into an electrical signal; and an actuator for focusing the laser beam with respect to the magnetic optical disc 20 or positioning the laser beam on an information track.

The RF amplifier 7 generates various signals satisfying each purpose from various kinds of electrical signals from the optical pickup 2.

The ADIP decoder 6 detects address information of the magnetic optical disc 20 from a wobble signal. It is to be noted that the wobble signal is a signal extracting wobble of a group (groove) recorded on the magnetic optical disc 20 in advance and is generated by the RF amplifier 7.

In case of reproducing information recorded on the magnetic optical disc 20, the EFM encoder/decoder 9 performs EFM (Eight to Fourteen Modulation) demodulation with respect to data of an RF (Radio Frequency) signal generated by the RF amplifier 7. This RF signal is obtained by extracting a signal recorded on the magnetic optical disc 20. Further, in case of recording information on the magnetic optical disc 20, the EFM encoder/decoder 9 has a function for performing EFM modulation with respect to data from the DRAM 12 which will be described later.

When recording information on the magnetic optical disc 20, the magnetic head 3 applies a magnetic field to a magnetic film of the magnetic optical disc 20 heated to the Curie temperature or above by the laser beam.

The head drive circuit 5 determines a direction of the magnetic field with respect to the magnetic head 3 in accordance with data to which EFM modulation has been applied by the EFM encoder/decoder 9, and drives the magnetic head 3.

In case of reproducing information from the magnetic optical disc 20, the DRAM 12 stores therein the data which has been EFM-demodulated by the EFM encoder/decoder 9, Furthermore, in case of recording information on the magnetic optical disc 20, the DRAM 12 stores therein data compressed by the later-described data compression encoder/decoder 13.

The DRAM control circuit 11 controls input/output of data to/from the DRAM 12.

When reproducing information from the magnetic optical disc 20, the data compression encoder/decoder 13 uncompresses data from the DRAM 12 and outputs the uncompressed signal from the output portion 15. Moreover, when recording information on the magnetic optical disc 20, the data compression encoder/decoder 13 compresses a signal from the input portion 14 and outputs it to the DRAM 12.

The servo control circuit 8 controls the spindle motor, a non-illustrated carriage motor for driving the optical pickup 2 in the radial direction or an actuator for the optical pickup 2.

It is to be noted that illustrations of an A/D converter for converting an analog signal into a digital signal and a D/A converter for converting a digital signal into an analog signal are omitted.

The system controller 51 includes a CPU 51*a*, a ROM 51*b*, a RAM 51*c* and a VRAM 51*d*, and controls respective constituent parts in the information recording/reproducing unit 50. In addition, the system controller 51 records, reads and reproduces information to the magnetic optical disc 20. Additionally, the CPU 51*a* of the system controller 51 has functions as a display controlling device and a function controlling device which are characteristic parts of the present invention, and controls display modes of the display unit 53 based on management information called TOC. Also, it controls operation function modes of later-described operation buttons provided to the input portion 52. Further, such TOC is recorded at the innermost circumference part of the magnetic optical disc. The ROM 51*b* stores therein a display control or function control processing program or the like, and the RAM 51*c* is mainly used as a work area. Furthermore, the VRAM 51*d* stores therein display screen data displayed in the display unit 53. The input unit 52 has a function as an operating unit for giving various operation instructions from a user. The display unit 53 has a function as a displaying device in the present invention and mainly displays information in TOC.

Detailed description will now be given as to control over display modes of the display portion 53 and the operation function modes carried out based on the TOC.

The logical structure of the TOC will be first described with reference to FIGS. 2A and 2B. The TOC according to this embodiment is comprised of management information such as a disc name, track number information given to one track, song names, a number of songs, performance times and others as well as group management information including group name information and others. The group management information indicates information generated in order to manage one or a plurality of tracks as one group. The group management information is, however, selective recording information, and it may or may not be included in the TOC. When the group management information is included in the TOC, the group (group name information) and the track number information are associated with each other by the group management information. Incidentally, when the group name information is given to tracks belonging to a specific group, there are a method for giving to each of the tracks information indicative of which group each track belongs to and a method for giving to each group information indicating which track belongs to that group. In case of the former method, the group management information takes the mode <<TNO 1/Group A, TNO 2/Group B, TNO 3/Group A, TNO 4/Group B, TNO 5/Group C>>. In case of the latter method, the group management information takes the mode <<Group A/TNO 1 & TNO 2 & TNO 3, Group B/TNO 4 & TNO 5>>. It is to be noted that meanings of "TNO 1" or "Group A" will be described later. Furthermore, a user can associate the track number information, the song names, the group name information with the tracks (songs) and arbitrarily give them from the input portion 52.

Figure 2A:
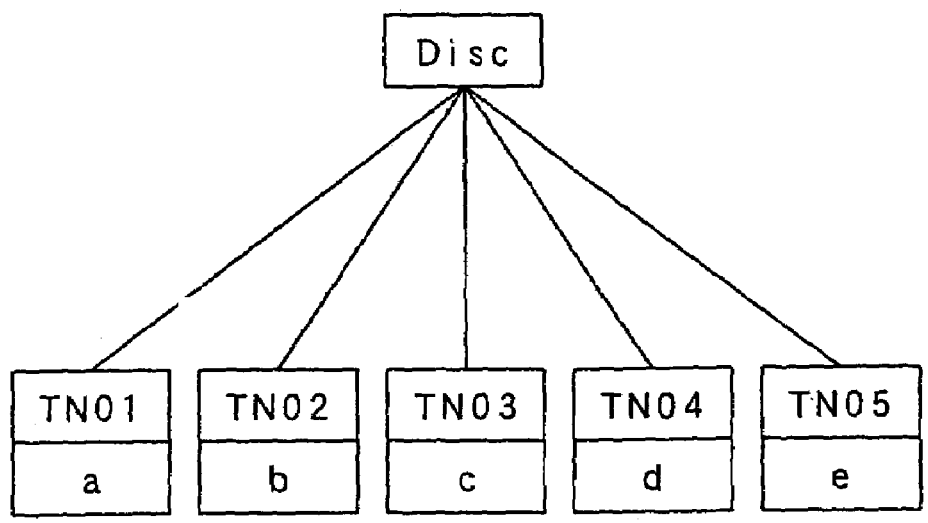
FIG. 2A is a view showing the relationship (logical structure) of a disc name, group name information, track number information and a track (song) in TOC when group management information is not included.

FIG. 2A is a view showing the relationship logical structure) of a disc name, track number information and tracks (songs) in the TOC when the group management information is not included. In FIG. 2A, "Disc" denotes a disc name. "TON 1" indicates track number information having a number "1" (TONs 2, 3, . . . also indicate track number information having respective numbers). "a" designates a track having a name "a" (here, a song called "a") (b, c, d, . . . also indicate songs having respective names). When special reproduction such as program reproduction or random reproduction is not specified, songs are reproduced in the order of the track number information (starting from a small number toward larger numbers) (which is the same in case of FIG. 2B).

Figure 2B:
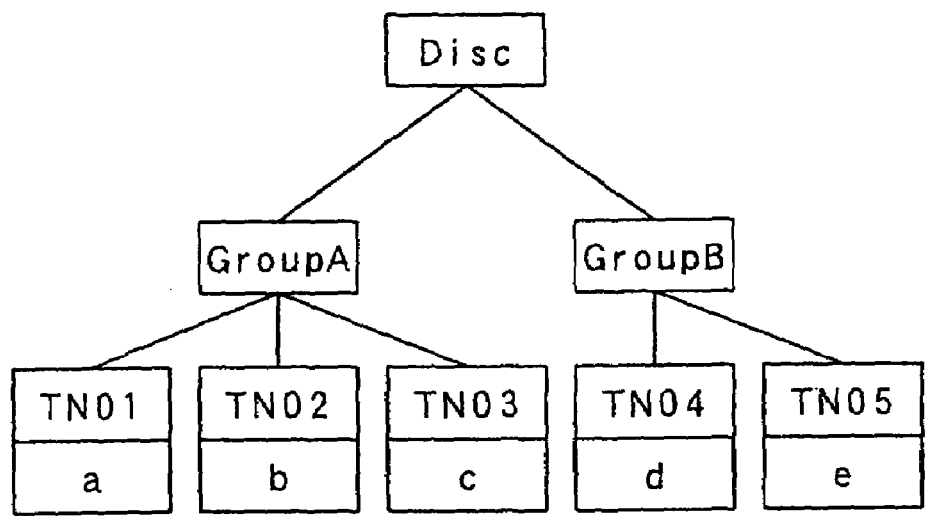
FIG. 2B is a view showing the relationship (logical structure) between a disc name, group name information, track number information and a track (song) in TOC when group management information is included.

On the other hand, FIG. 2B is a view showing the relationship (logical structure) of a disc name, group name information, track number information and tracks (songs) in the TOC when the group management information is included. In FIG. 2B, "Group A" indicates a group managed under a name "A" (Groups B, C, D, . . . also indicate groups managed under respective names). In the example shown in FIG. 2B, the Groups A and the Group B are registered in one Disc, and a song "a" having TON 1 given thereto, a song "b" having TON 2 given thereto and a song "c" having TON 3 given thereto belong to the Group A, and a song "d" having TON 4 given thereto and a song "e" having TON 5 given thereto belong to the Group B. In this manner, when the group management information is included, the recorded songs are under group management.

Figure 3:
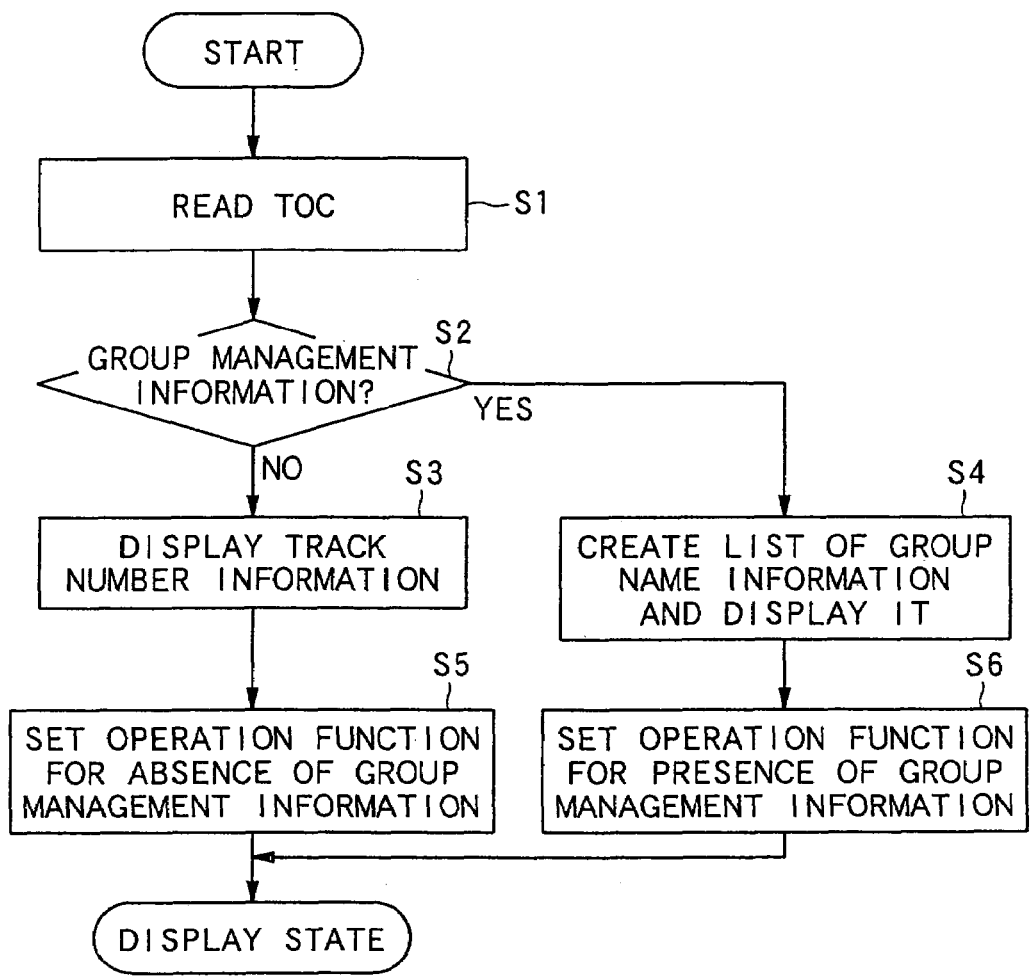
FIG. 3 is a flowchart showing display control and a function control processing routine according to a first embodiment of the present invention.

Description will now be given as to display control and function control processing by the CPU 51*a* when controlling the display modes of the display unit 53 and the operation function modes with reference to FIGS. 3 and 4. FIG. 3 is a flowchart showing display control and a function control processing routine of the CPU 51*a*.

In display control and function control processing shown in FIG. 3, when the magnetic optical disc 20 is first inserted into the magnetic optical disc recording/reproducing apparatus 100, the CPU 51*a* reads the TOC from the innermost circumference part of the magnetic optical disc and stores it in the RAM 51*a* (step S1). Then, the CPU 51*a* determines whether there is group management information in the read TOC (step S2). If it is determined that there is no group management information, the CPU 51*a* reads display screen data from the VRAM 51*d* and displays it in the display unit 53. Also, the CPU 51*a* reads track number information from the RAM 51*a* and displays it on the display screen (step S3). Then, the CPU 51*a* sets the operation function for absence of the group management information with respect to the later-described operation buttons 70 of the input unit 52 (step S5). On the other hand, if it is determined that there is the group management information, the CPU 51*a* reads display screen data from the VRAM 51*d* and displays it in the display unit 53. Also, the CPU 51*a* reads the group management information from the RAM 51*a*, creates a list of that information and displays it on the display screen (step S4). Subsequently, the CPU 51*a* sets the operation function for absence of the group management information with respect the later-described operation buttons 70 of the input portion 52 (step S6). As described above, the CPU 51a changes the display mode depending on the case where the group management information is recorded and the case where the same is not recorded and displays it in the display unit 53. Further, the CPU 51a also changes the function set to the respective operation buttons 70 of the input unit 52 depending on the case where the group management information is recorded and the case where the same is not recorded.

Figure 4A:
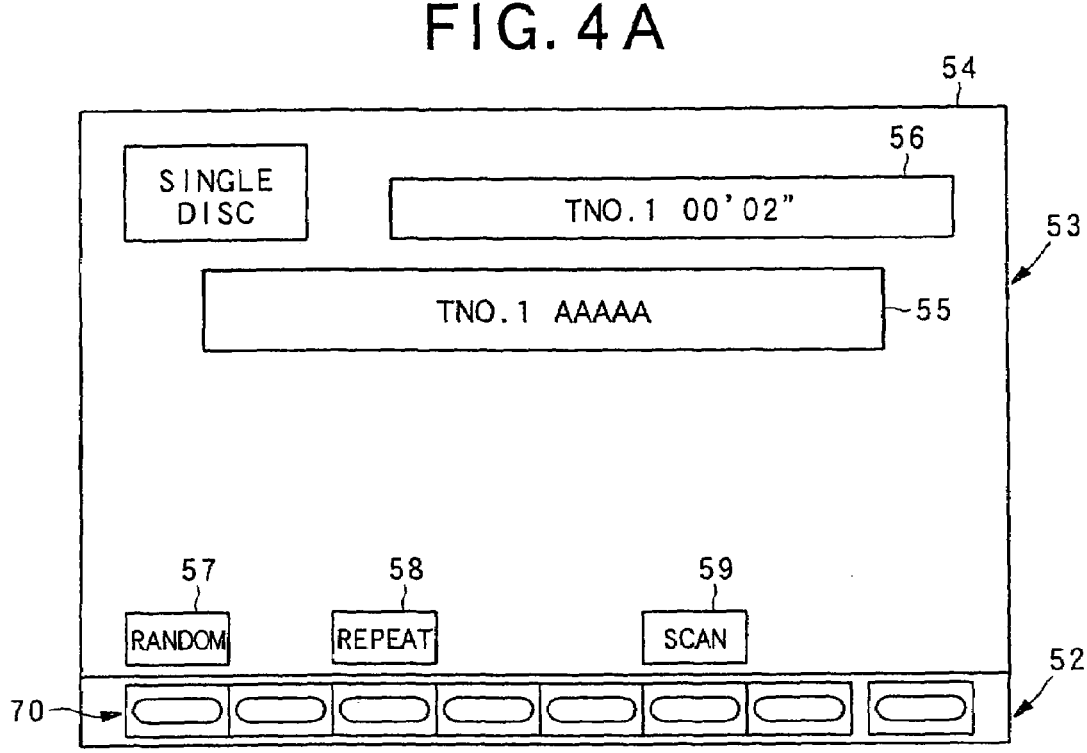
FIG. 4A is a view showing a display screen example displayed in a display portion when the group management information is not included in TOC in the first embodiment according to the present invention.
Figure 4B:
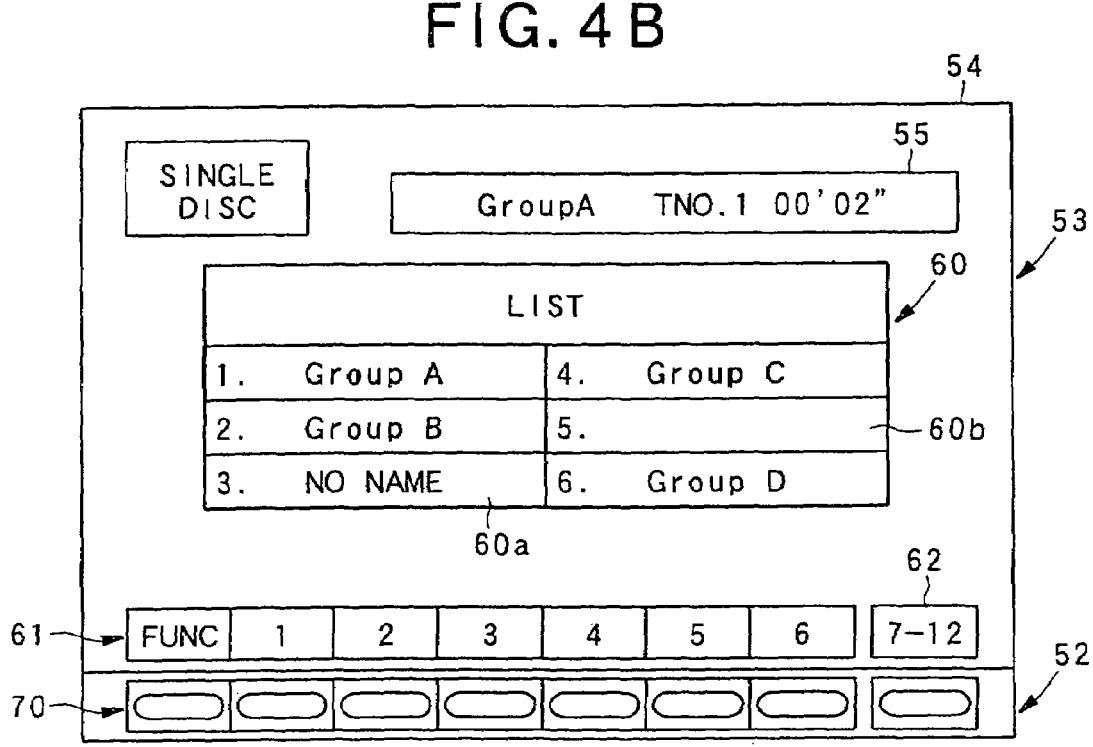
FIG. 4B is a view showing a display screen example displayed in a display portion when the group management information is included in TOC in the first embodiment according to the present invention.

FIGS. 4A and 4B show display screen examples displayed in the display unit 53 in the above-described manner. Furthermore, the operation buttons 70 are shown at the lower part of the display unit 53. FIG. 4A shows a display screen 54 when the group management information is not recorded, and a section denoted by reference numeral 55 immediately displays track number information of TNO. 1 (first song) as well as a corresponding song name (AAAAA). Moreover, a section denoted by reference numeral 56 in the display screen 54 in FIG. 4A displays track number information of a song which is in the reproduction process and a reproduction time. In this case, reproduction of the song (track) is performed from the TNO. 1 by inputting a reproduction start instruction from the input portion 52. In addition, in the screen 54 shown in FIG. 4A are displayed a random key 57, a repeat key 58 and a scan key 57 so as to be positioned to the operation buttons 70 of the input unit 52 arranged in the vicinity of the lower part of the display unit 53. When the operation buttons 70 corresponding to such keys are pressed, random reproduction of songs, repeated reproduction of songs, and others are carried out.

On the other hand, FIG. 4B shows a display screen 54 when the group management information is recorded, and a part denoted by reference numeral 60 displays a list of the group management information. In the display screen 54 shown in FIG. 4B are displayed five sets of the group name information ("Group A", "Group B", "NO NAME", "Group C" and "Group D") in the list 60, and a number indicative of the reproduction order is displayed on the left side of each group name information.

Here, although "NO NAME" displayed in the part 60a is under group management, the group name information is not given to "NO NAME" by a user. Moreover, although nothing is displayed in a part denoted by reference numeral 60b, this means that a track (song) which is not under group management exists, In addition, function keys 61 are displayed at the lower part of the display screen 51 shown in FIG. 4B so as to be positioned to the operation buttons 70 of the input unit 52. Numbers of the function keys 61 correspond to numbers indicative of the reproduction order in the list 60. Additionally, when a number of the function keys 61 is selected by pressing the operation button 70 of the input unit 52, a group to be reproduced at first can be specified. The function keys 62 are used for displaying in the list 60 the group management information which is not currently shown in the list with the number indicative of the reproduction order being "7" or subsequent numbers.

As described above, according to this embodiment, a user can be caused to immediately perceive presence/absence of the group management information by changing the display mode or the operation function depending on presence/absence of the group management information. Further, when the group management information is not recorded, since the unproductive operation such as switching of screens by a user can be eliminated, the operation loads to the user can be reduced. Furthermore, when the group management information is recorded, since the group management information is listed and displayed so as to be selectable, the group can be rapidly selected.

(Second Embodiment)

A second embodiment according to the present invention will now be described with reference to FIGS. 5 to 8. It is to be noted that like reference numerals denote parts common to the first embodiment, thereby omitting their explanation.

In this embodiment, the information displaying/reproducing device according to the present invention is applied to the magnetic optical disc recording/reproducing device mentioned above. The CPU 51a according to this embodiment executes editing processing of the TOC and display processing at the time of that editing. Therefore, the ROM 51b in this embodiment stores therein an editing processing program, a display processing program and others.

In the logical structure of the TOC described with reference to FIGS. 2A and 2B, a user can specify track number information of a song from the input unit 52 and moves it to a desired position. Here, movement does not means that song data itself recorded on the magnetic optical disc changes a recording position on that disc, but means that the track number information given to the track (song) is changed. That is, when special reproduction such as program reproduction or random reproduction is not specified, reproduction is carried out in the order of the track number information (from a small number toward larger numbers). However, it is as if the order of recording of song data is varied by a change in the track number information. As a result, movement of the track (song) in this embodiment means a change in the logical position of the track (song).

Further, in the TOC editing processing, when a song specified from the input unit 52 is moved to a specified position, the track number information is automatically re-imparted. Re-imparting has the continuity that the track number information increases from the first number to the last number, and is executed based on a rule that a vacant number is admitted.

Figure 5:
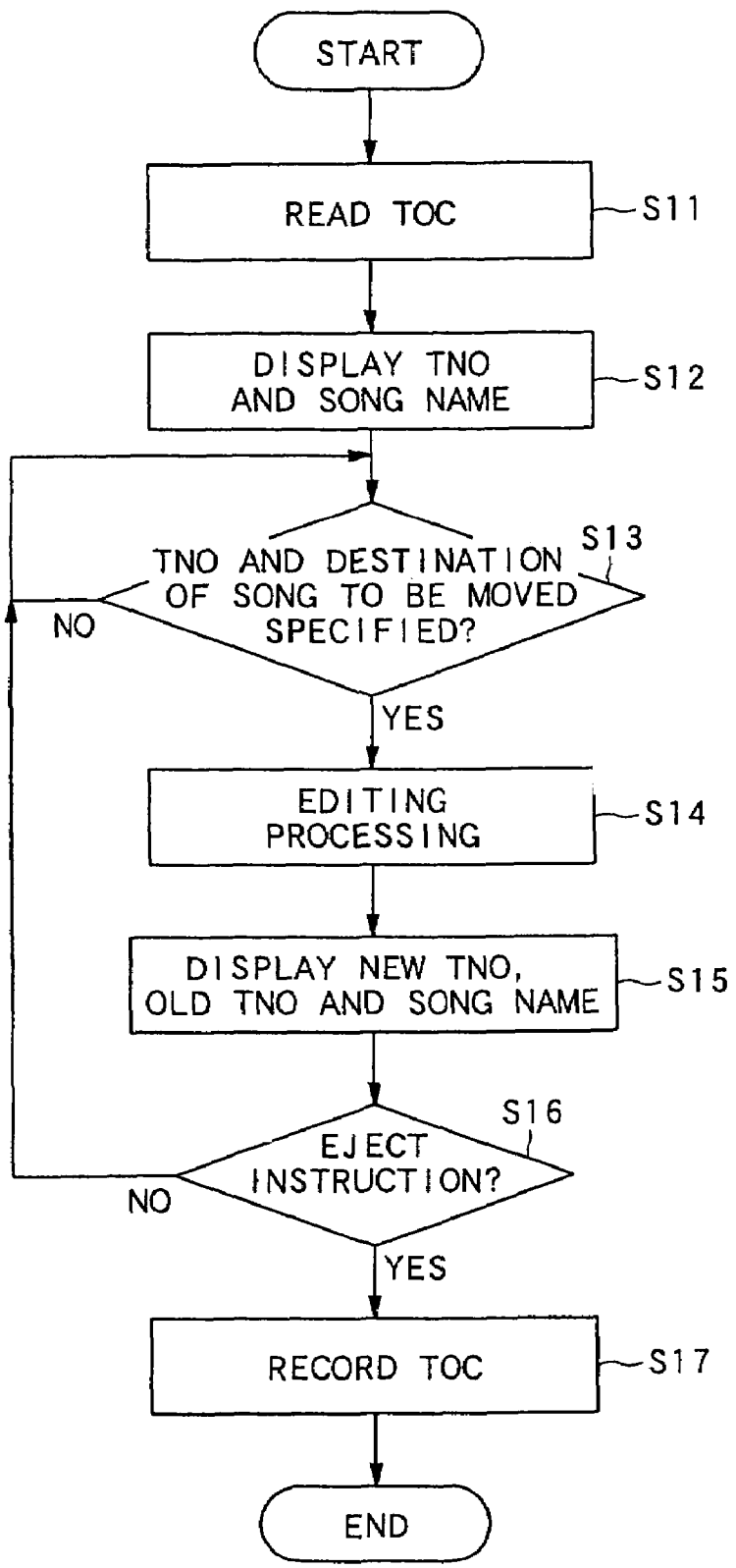
FIG. 5 is a flowchart showing a display processing routine at the time of TOC editing when the group management information is not included according to a second embodiment of the present invention.

Description will now be given as to display processing at the time of TOC editing by the CPU 51a when the group management information is not included in the TOC with reference to FIGS. 5 and 6. FIG. 5 is a flowchart showing a display processing routine at the time of TOC editing. FIG. 6 show display screen examples of the display unit 53. In the display processing shown in FIG. 5, the CPU 51a first reads TOC from the magnetic optical disc 20 and temporarily stores it in the RAM 51c (step S11). Furthermore, as shown in FIG. 6A, the CPU 51a displays the TNOs and song names as shown in FIG. 6A (step S12). In the example of FIG. 6A, TNOs are displayed in the order of numbers, and a name of a song corresponding to each TNO is displayed below that TNO.

Subsequently, when a user sees a display content of the display unit 53 and specifies the TNO of a song to be moved and its destination (logical position) from the input unit 52, for example, specifies to move the song "b" of the TNO. 2 to the position between the song "d" of the TNO. 4 and the song "e" of the TNO. 5 as shown in FIG. 6B, the CPU 51a recognizes it (step S13) and executes the editing processing (step S14). That is, the CPU 51a performs the processing for moving the song "b" of the specified TNO. 2 to the specified destination, and re-imparts the track number information to all the songs after movement. Then, as shown in FIG. 6C, the CPU 51a displays in such a manner that the TNOs given to all the songs when the management information is recorded in the RAM 51c at the step S11 (which will be referred to as "old TNOs" hereinafter) are associated with the TNOs newly given to all the songs after moving the specified song (which will be referred to as "new TNOs" hereinafter), and displays song names of songs corresponding to those TNOs (step S15). In the example of FIG. 6C, the new TNOs, the old TNOs and the song names are displayed in the order of the new TNOs. Moreover, when a user specifies the TNO of a song to be moved and a destination (logical position) from the input unit 52, for example, specifies to move the son, "d" of the new TNO. 3 to a position before the song "a" of the new TNO. 1 as shown in FIG. 6D, the CPU 51a executes the editing processing at the step S4 and displays the new TNOs, the old TNOs and song names as shown in FIG. 6E. Then, when a user gives, e.g., an eject instruction from the input unit 52, the CPU 51a recognizes it (step S16), and records the TOC edited at the innermost circumference part of the magnetic optical disc 20 (step S17).

In this manner, even if editing is repeatedly carried out, the old TNOs are displayed together with the new TNOs. A user can, therefore, comprehend the state of songs before editing and efficiently perform editing without being confused.

Description will now be given as to display processing by the CPU 51a at the time of TOC editing when the group management information is included in the TOC with reference to FIGS. 7 and 8. FIG. 7 is a flowchart showing a display processing routine at the time of TOC editing. FIG. 8 show display screen examples of the display unit 53. In the display processing shown in FIG. 7, the CPU 51a first reads the TOC from the magnetic optical disc 20 and temporarily stores it in the RAM. 51c (step S21). Also, as shown in FIG. 8A, the CPU 51a displays the TNOs, the Groups (group name information) and song names in the display portion 53 (step S22). In the example of FIG. 8A, the TNOs are displayed in the order of numbers, and a song name of a song corresponding to each TNO is displayed below that TNO. Further, in the example of FIG. 8A, the group name information to which that song belongs is displayed between the TNO and the song name.

Subsequently, when a user sees the display content of the display unit 53 and specifies the TNO of a song to be moved and a destination (logical position) from the input unit 52, for example, specifies to move the song "b" of the TNO. 2 belonging to the Group A to a position between the song "d" of the TNO. 4 and the song "e" of the TNO. 5 of the Group B as shown in FIG. 8B, the CPU 51a recognizes it (step S23) and executes the editing processing (step S24). That is, the CPU 51a registers the song "b" of the specified TNO. 2 to the Group B, moves it to the specified destination, and re-imparts the track number information to all the songs after movement.

Then, as shown in FIG. 8C, the CPU 51a displays in such a manner that TNOs given to all the songs when the management information is recorded in the RAM 51c at the step S21 (which will be referred to as "old TNOs" hereinafter) are associated with TNOs newly given to all the songs after moving the specified song (which will be referred to as "new TNOs" hereinafter), and also displays song names of songs corresponding to these TNOs. Further, the CPU 51a displays in such a manner that the group name information given to an arbitrary song when the management information is recorded in the RAM 51c at the step S11 (which will be referred to as an "old Group" hereinafter) is associated with the group name information given to an arbitrary song after specified movement (which will be referred to as a "new Group" hereinafter) (step S25). In the example of FIG. 8C, the new TNOs, the old TNOs, the new Groups, the old Groups and song names are displayed in the order of the numbers of the new TNOs. Furthermore, when a user specifies the TNO of a song to be moved and a destination (logical position) from the input unit 52, for example, specifies to move the song "d" of the new TNO. 3 belonging to the Group B to a position before the song "a" of the new TNO. 1 belonging to the Group A as shown in, e.g., FIG. 8D, the CPU 51a executes the editing processing at the step S14 and displays the new TNOs, the old TNOs, the new Groups and the old Groups and song names as shown in FIG. 8E. Then, when a user gives, e.g., an eject instruction from the input unit 52, the CPU 51a recognizes it (step S26) and records the edited TOC at the innermost circumference part of the magnetic optical disc 20 (step S27).

In this manner, even if the editing processing is repeatedly carried out, the old TNOs and the old Groups are displayed together with the new TNOs and the new Groups. A user can, therefore, comprehend the state of the songs before editing, and can efficiently perform editing without being confused when carrying out the operation for moving a very large number of songs.

(Third Embodiment)

A third embodiment according to the present invention will now be described with reference to FIGS. 9 to 18. It is to be noted that like reference numerals denote parts common to the first embodiment, thereby omitting their explanation.

In this embodiment, the information editing device according to the present invention is applied to the above-described magnetic optical disc recording/reproducing device. In the CPU 51a according to this embodiment, the editing processing of the TOC in the CPU 51a and the display processing at the time of that editing are executed. Therefore, the ROM 51b according to this embodiment stores therein a TOC editing processing program and others. Furthermore, in this embodiment, it is assumed that the group management information is included in the TOC as shown in FIG. 2B.

In the example shown in FIG. 2B, the Group A and the Group B are registered in one Disc. Moreover, the song "a" having the TON 1 given thereto, the song "b" having the TON 2 given thereto and the song "c" having the TON 3 given thereto belong to the Group A, and the song "d" having the TON 4 given thereto and the song "e" having the TON 5 given thereto belong to the Group B. In this manner, in the TOC according to this embodiment, the recorded songs are grouped and managed (group management). According to such group management, when a user specifies one song through the input unit 52, he/she can first perform specification for narrowing down the range, for example, specify the Group A and then further specify the TON 1 which is the track number information belonging to the Group A.

In addition, in the TOC editing processing, when a specified song is moved, it is possible to edit group management. Here, movement does not means that the song data itself recorded on the magnetic optical disc changes the recording position on that disc but means that the track number information given to the track (song) is changed. That is, when special reproduction such as program reproduction or random reproduction is not specified, reproduction is carried out in the order of the track number information (from a small number toward larger numbers). However, it is as if the order of recording the song data is varied due to a change in the track number information. As a result, movement of the track (song) in this embodiment means a chance in the logical position of the track (song).

Additionally, in the TOC editing processing, when changing the track number information, there is determined the rule for imparting the track number information (which will be referred to as the "TNO imparting rule" hereinafter), i.e., i) the same track number information is not used for different groups, and ii) the track number information for each group has the continuity increasing from the first number to the last number and a vacant number is admitted.

Description will now be given as to the mode of movement of the track (song) in the TOC editing processing with reference to FIGS. 9 to 12. FIGS. 9 and 10 show the mode when a song specified by a user is moved to a logical position desired by the user from the structure shown in FIG. 2B. A method for specifying a song in this mode is carried out by specifying the track number information (which can be substituted by a song name) given to that song.

Figure 9A:
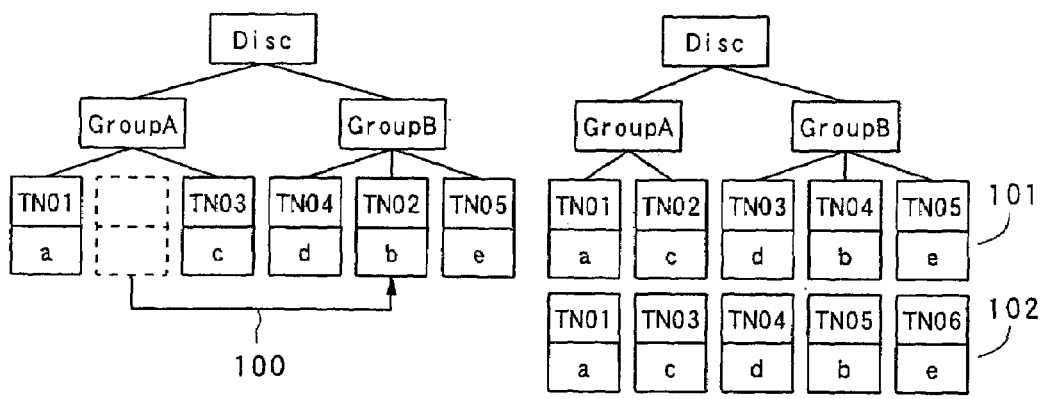
FIG. 9A is a view (part 1) showing the mode when a song specified by a user is moved to a logical position desired by the user from the structure illustrated in FIG. 2B according to a third embodiment of the present invention.

FIG. 9A shows the mode when a song to be moved is specified and that song is moved to a specific logical position of an existing (registered) group. In this case, as indicated by an arrow 100 in FIG. 9A, the song "b" (TNO 2) belonging t the Group A is moved to the position right behind the song "b" (TNO 4) belonging to the Group B. After movement, as indicated by reference numeral 101 in FIG. 9A, the TNO is re-imparted as the entire Groups A and B in accordance with the TNO imparting rule. That is, when the order of songs is determined as "d", "b" and "e", the TNO is given in such a manner that the number increases in that order. As an example of how such a mode is used, there is a case that the group of the song "b" is changed to an existing group and the song "b" should be reproduced immediately after the song "d" in that group. Incidentally, as indicated by reference numeral 102 in FIG. 9A, the TNO may be re-imparted only in the Group B in accordance with the TNO imparting rule.

Figure 9B:
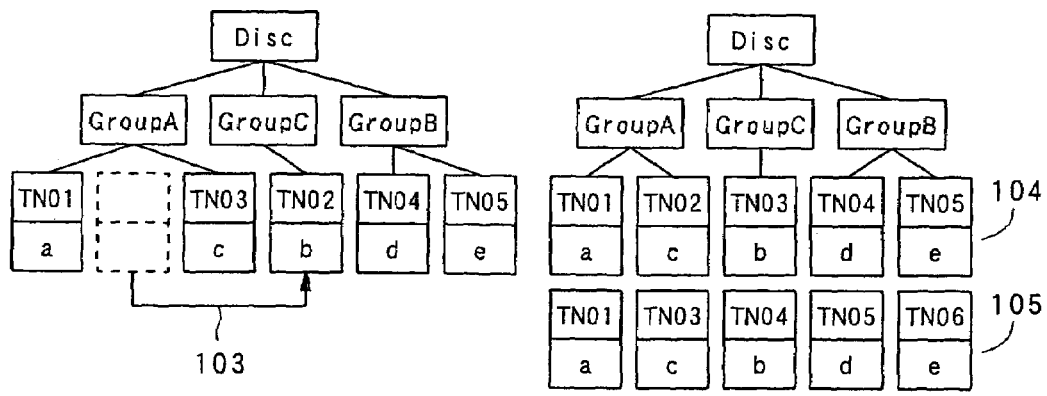
FIG. 9B is a view (part 2) showing the mode.

FIG. 9B shows a mode in which a song to be moved is specified, new group name information is given to that song, and that song is moved to a specific logical position between the existing groups. In this case, as indicated by an arrow 103 in FIG. 9B, a new Group C is given to the song "b" (TNO 2) belonging to the Group A, and that song is moved to a position right after the song "c" (TNO 3) of the Group A. After movement, as indicated by reference numeral 104 in FIG. 9B, the TNO is re-imparted as the entire Groups A, B and C in accordance with the TNO imparting rule. As an example of how such a mode is used, there is a case that a group of the song "b" is newly created and that song "b" should be reproduced immediately after the song of the Group "A". Also, there is a case that when a song is moved while confirming the border between the groups, that song happens to be moved to the border. As described above, when the song "b" (TNO 2) is moved to a position right behind the song "c" (TNO 3), the relationship in greatness between the songs "c", "b" and "d" is "c"<"b"<"d" according to the TNO imparting rule. Incidentally, when the TNO imparting rule is satisfied, the TNO is re-imparted only in the Groups B and C as indicated by reference numeral 105 in FIG. 9B.

Figure 9C:
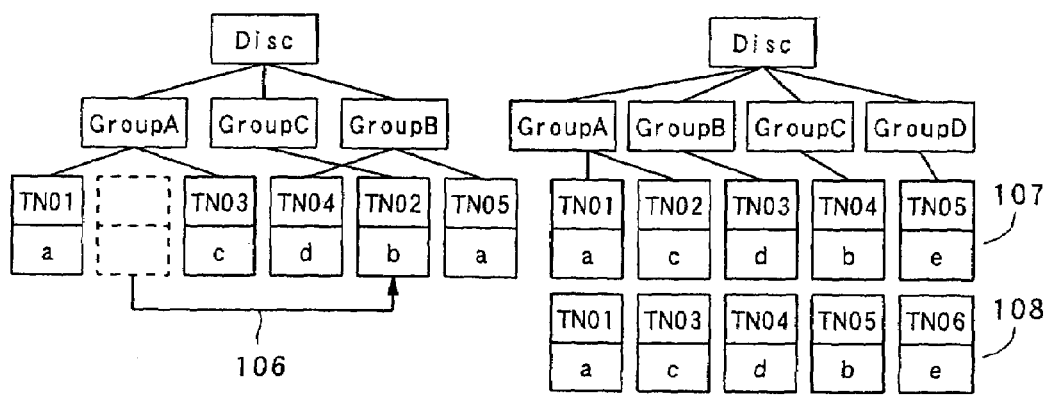
FIG. 9C is a view (part 3) showing the mode.

FIG. 9C shows a mode that a song to be moved is specified, new group name information is given to that song, and that song is moved to a specific logical position in an existing group. In this case, as indicated by an arrow 106 in FIG. 9C, a new Group C is given to the song "b" (TNO 2) belonging to the Group A, and that song is moved to a position right after the song "d" (TNO 4) belonging to the Group B. However, since this requires a group to be provided in the group, which results a structure having a plurality of group layers.

In such a structure having a plurality of group layers, a user must memorize that structure, and it takes a time to specify a desired song in this structure, which is not preferable. In such a case, therefore, as indicated by reference numeral 107 in FIG. 9C, the Group B is automatically divided into the Group B and the Group D, and the song "d" (TNO 4) remains to belong to the Group B. Further, the new Group D is given to the song "e" (TNO 5) (such automatic division will be referred to as the "division rule" hereinafter). Furthermore, in accordance with the TNO imparting rule, the TNO is re-imparted to the entire Groups A, B, C and D. As an example of how such a mode is used, there is a case that a high value is attached to the order of songs rather than the group property. Incidentally, although the group must be structurally divided in this manner, the same name can be used for the respective divided groups. Moreover, in accordance with the TNO imparting rule, as indicated by reference numeral 108 in FIG. 9C, the TNO may be re-imparted only in the Groups B, C and D.

Figure 10A:
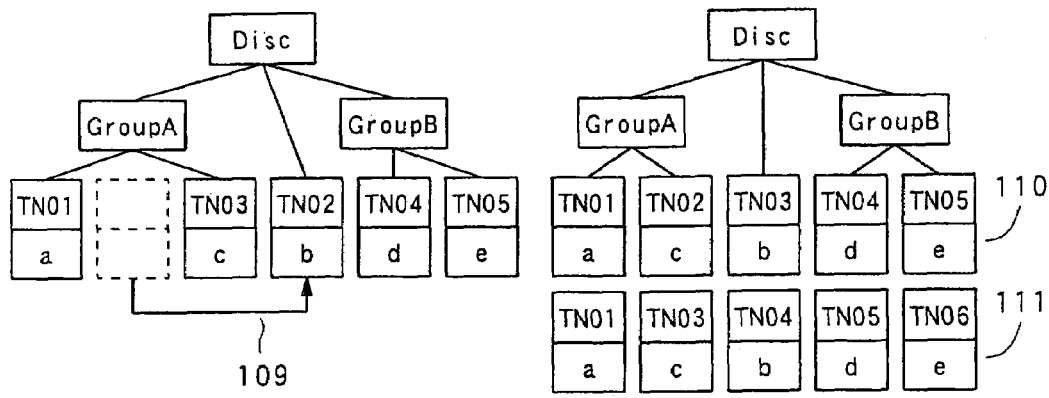
FIG. 10A is a view (part 4) showing the mode when a song specified by a user is moved to a logical position desired by the user from the structure depicted in FIG. 2B according the third embodiment of the present invention.

FIG. 10A shows a mode in which a song to be moved is specified and that song is moved to a specific logical position between the existing groups without being group-managed. In this case, as indicated by an arrow 109 in FIG. 10A, the song "b" (TNO 2) belonging to the Group A is no longer under group management, and that song is moved to a position right after the song "c" (TNO 3) belonging to the Group A. After movement, as indicated by reference numeral 110 in FIG. 10A, the TNO is re-imparted to the entire Groups A, B and C including songs which are not under group management in accordance with the TNO imparting rule. In this case, as similar to the mode illustrated in FIG. 9B, the relationship of greatness of the respective TNOs between the songs "c", "b" and "d" becomes "c"<"b"<"d" in accordance with the TNO imparting rule.

Moreover, in accordance with the TNO imparting rule, as indicated by reference numeral 111 in FIG. 10A, the TNO can be re-imparted to the groups except the Group A.

Figure 10B:
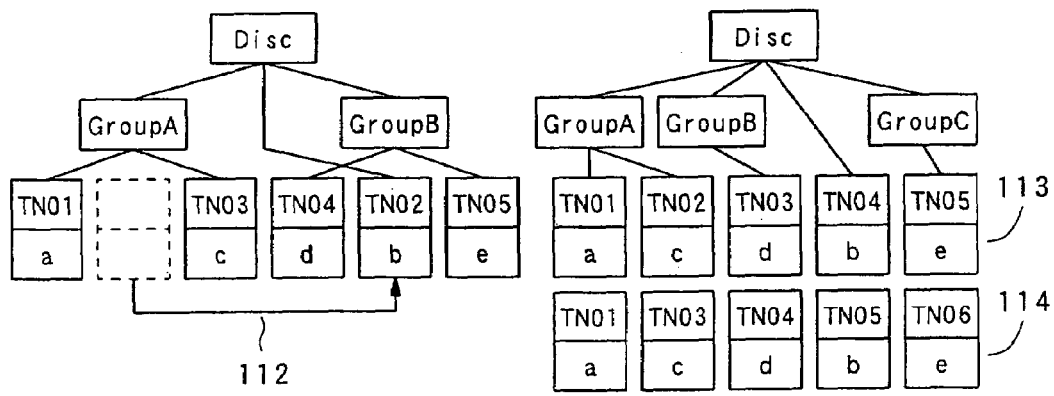
FIG. 10B is a view (part 5) showing the mode.

FIG. 10B shows a mode that a song to be moved is specified and that song is moved to a specific logical position in the existing group without being group-managed. In this case, as indicated by an arrow 112 in FIG. 10B, the song "b" (TNO 2) belonging to the Group A is no longer under group management, and that song is moved to a position right after the song "d" (TNO 4) belonging to the Group B. In this case, as similar to the mode shown in FIG. 9C, as designated by reference numeral 113 shown in FIG. 10B, the Group B is divided into the Group B and the Group C based on the division rule, and the song "d" (TNO 4) remains to belong to the Group B, and the Group C is newly imparted to the song "e" (TNO 5). In addition, in accordance with the TNO imparting rule, the TNO is re-imparted to the entire Groups A, B and C including the songs which are not under group management. Incidentally, in this case, although the group must be structurally divided, the respective divided groups can use the same name. Additionally, in accordance with the TNO imparting rule, as designated by reference numeral 114 shown in FIG. 10B, the TNO may be re-imparted to the groups except the Group A.

Figure 10C:
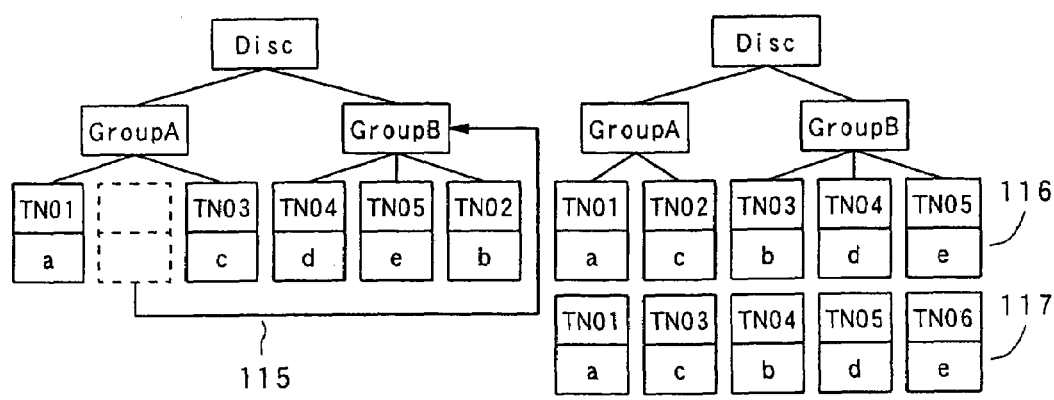
FIG. 10C is a view (part 6) showing the mode.

FIG. 10C shows a mode in which a song to be moved is specified and that song is moved into the existing group. In the modes shown in FIGS. 9A to 10B, a user arbitrarily specifies a logical position to which the song is moved. However, the mode illustrated in FIG. 10C is different from the former modes in that a user specifies only group name information of a destination but does not specify a specific logical position inside/outside the group. In this case, as designated by an arrow 115 in FIG. 10C, the song "b" (TNO 2) belonging to the Group A is moved to a position in the Group B. Here, a rule for ordering songs in the group (which will be referred to as the "ordering rule" hereinafter) is determined in advance, and a logical position in the Group B to which the song is moved is determined in accordance with that ordering rule. In the example designated by reference numeral 116 shown in FIG. 10C, the song names are ordered in accordance with the alphabetic order, and the TNO is re-imparted to the entire Groups A and B in accordance with the TNO imparting rule. Incidentally, as designated by reference numeral 117 in FIG. 10C, in accordance with the TNO imparting rule, the TNO may be re-imparted only in the Group B.

Figure 11:
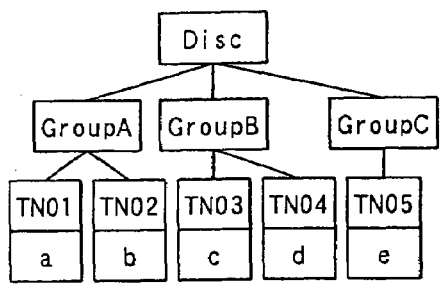
FIG. 11A is a view showing the structure of TOC before moving a group in the third embodiment according to the present invention.
FIG. 11B is a view (part 1) showing the mode when a group specified by a user to a logical position desired by the user from the structure illustrated in FIG. 11A.
FIG. 11C is a view (part 2) showing the mode.
Figure 11:
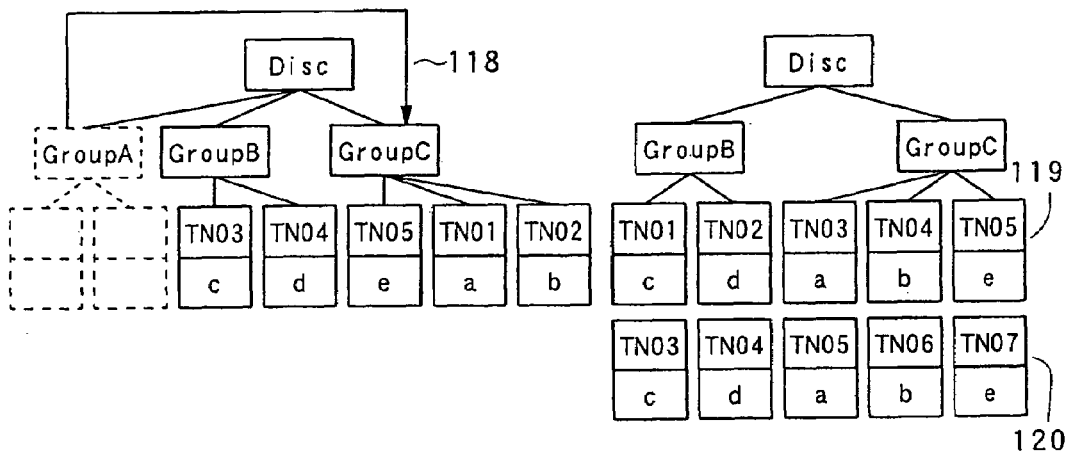
Figure 11:
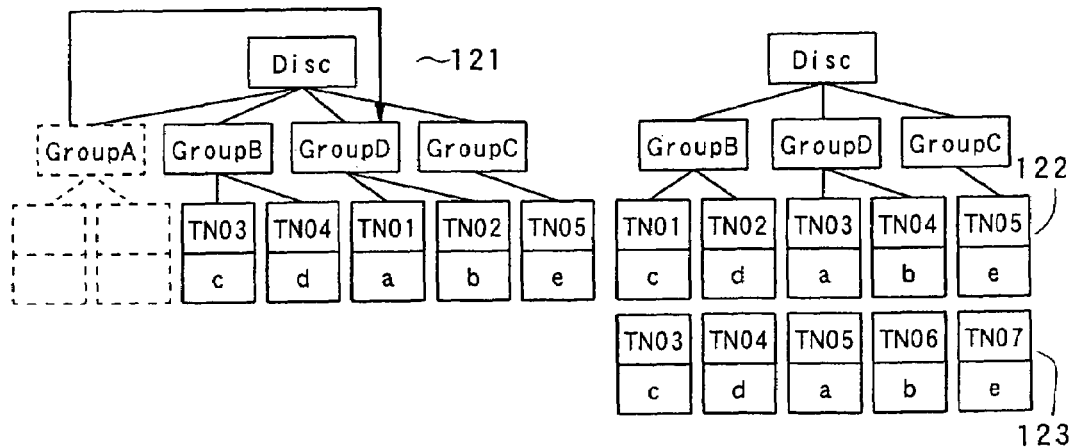

FIGS. 11 and 12 show a mode in which a group specified by a user is moved to a logical position desired by the user from the structure depicted in FIG. 11A. In this mode, a group is specified by designating the group name information given to that group. In this manner, by setting a target of movement to the entire group, a number of operations can be reduced when moving a large number of songs as compared with the modes illustrated in FIGS. 9 and 10 in which songs (for example, track number information) are specified.

FIG. 11B shows a mode in which a group to be moved is specified and songs included in that group are moved into the existing group. In this case, as indicated by an arrow 118 in FIG. 11B, the song "a" (TNO 1) belonging to the Group A and the song "b" (TNO 2) belonging to the same are all moved into the Group C. Here, as similar to the mode depicted in FIG. 10C, the ordering rule is previously determined, and logical positions in the Group C to which the songs are moved are determined in accordance with the ordering rule. As an example of how such a mode is used, there is a case that al the songs belonging to the group named "A" are incorporated into the existing group. Incidentally, as designated by reference numeral 120 in FIG. 11B, the TNO may be re-imparted only in the Group C in accordance with the TNO imparting rule.

FIG. 11C shows a mode in which a group to be moved is specified, that group is changed to a new group and moved to a specific logical position between the existing groups. In this case, as indicated by an arrow 121 in FIG. 11C, the Group A is changed to a new Group D and moved to a position immediately after the Group B. After movement, as designated by reference numeral 122 in FIG. 11C, the TNO is re-imparted as the entire Groups B, C and D in accordance with the TNO imparting rule. Incidentally, as designated by reference numeral 123 in FIG. 11C, the TNO may be re-imparted only in the Groups C and D in accordance with the TNO imparting rule.

Figure 12A:
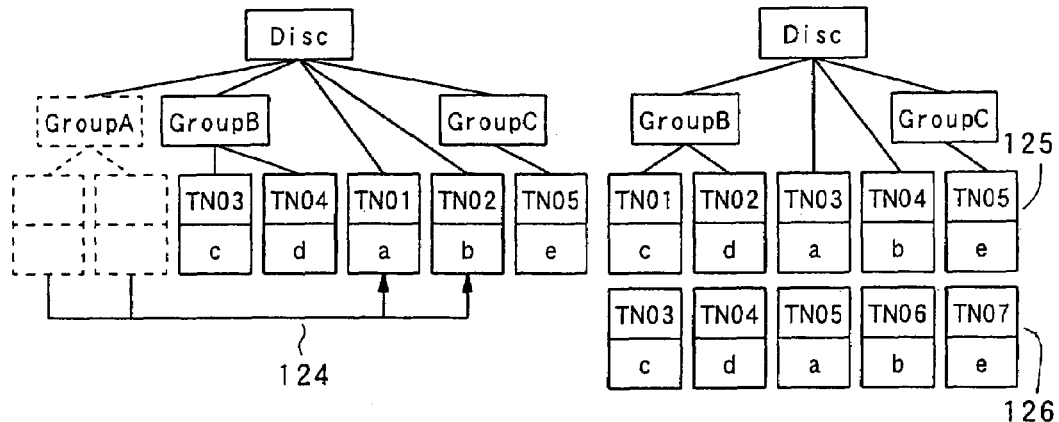
FIG. 12A is a view (part 3) showing the mode when the group specified by the user is moved to the logical position desired by the user from the structure depicted in FIG. 11A.

FIG. 12A shows a mode in which a group to be moved is specified and moved to a specific logical position between the existing groups without group-managing the songs belonging to that group. In this case, as indicated by an arrow 124 shown in FIG. 12A, the song "a" (TNO 1) belonging to the Groups A and the song "b" (TNO 2) belonging to the same are no longer under group management, and they are moved to positions immediately after the song "d" (TNO 4) belonging to the Group B. After movement, as designated by reference numeral 125 shown in FIG. 12A, the TNO is re-imparted as the entire Groups B and C including the songs which are not under group management in accordance with the TNO imparting rule. In this case, as similar to the modes illustrated in FIGS. 9B and 10A, the relationship of greatness of the TNO between the songs "d", "a", "b" and "c" becomes "d"<"a"<"b"<"c" in accordance with the TNO imparting rule. Further, as designated by reference numeral 126 shown in FIG. 12A, the TNO may be re-imparted to the groups except the Group B in accordance with the TNO imparting rule.

Figure 12B:
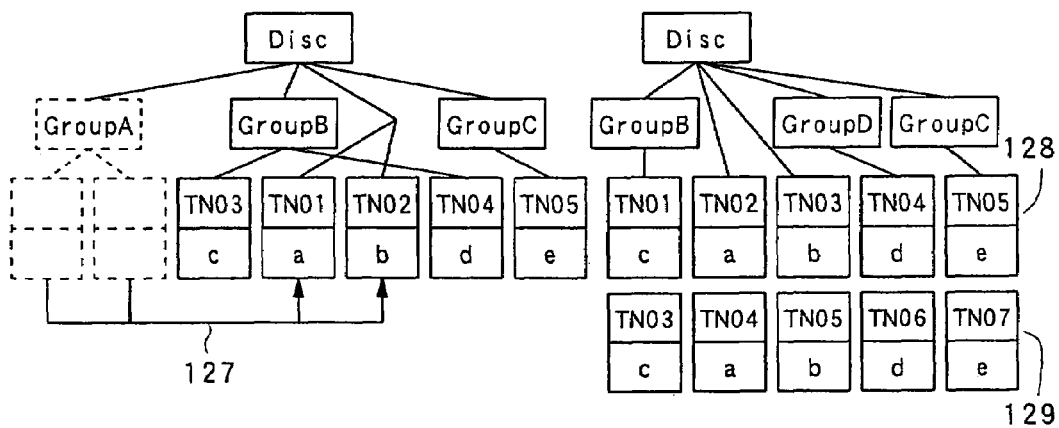
FIG. 12B is a view (part 4) showing the mode.

FIG. 12B shows a mode in which a group to be moved is specified and moved to a specific logical position in the existing group without group-managing the songs belonging to that group. In this case, as indicated by an arrow 127 shown in FIG. 12B, the song "a" (TNO 1) belonging to the Group A and the song "b" (TNO 2) belonging to the same are no longer under group management, and they are moved to positions immediately after the song "c" (TNO 3) belonging to the Group B. In this case, based on the division rule as similar to the modes depicted in FIGS. 9C and 10B, as indicated by an arrow 128 shown in FIG. 12B, the Group B is divided into the Group B and the Group D, and the song "c" (TNO 3) remains to belong to the Group B. Further, the Group D is newly imparted to the song "d" (TNO 4), and the TNO is re-imparted as the entire Groups B, C and D including the songs which are not under group management in accordance with the TNO imparting rule. Incidentally, as designated by reference numeral 129 in FIG. 12B, the TNO may be re-imparted to the groups except the Group B in accordance with the TNO imparting rule.

Figure 12C:
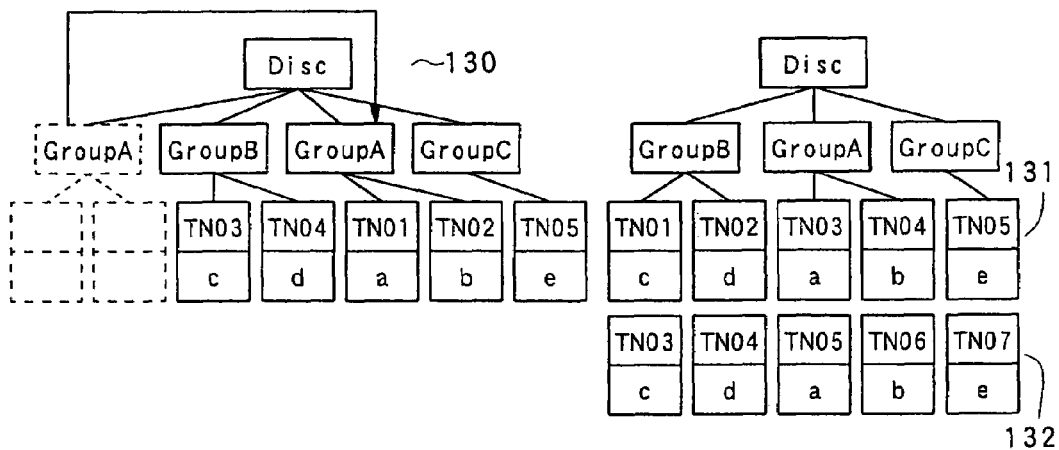
FIG. 12C is a view (part 5) showing the mode.

FIG. 12C shows a mode in which a group to be moved is specified and that group is moved to a specific logical position between the existing groups. In this case, as indicated by an arrow 130 in FIG. 12C, the Group A is moved to a position immediately after the Group B. After movement, as designated by reference numeral 131 in FIG. 12C, the TNO is re-imparted as the entire Groups A, B and C in accordance with the TNO imparting rule. Incidentally, in accordance with the TNO imparting rule, the TNO may be re-imparted to the groups except the Group B as designated by reference numeral 132 in FIG. 12C.

Figure 13A:
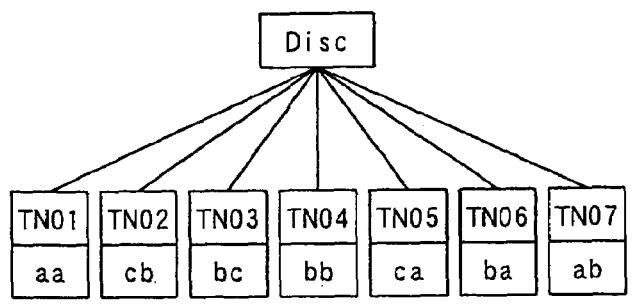
FIG. 13A is a view (part 1) showing the mode when group name information is given to a plurality of songs which are not under group management according to the third embodiment of the present invention.
Figure 13B:
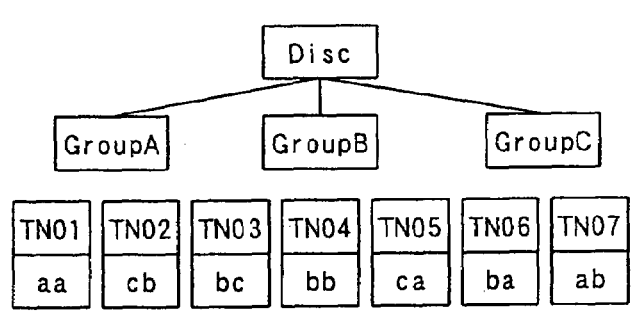
FIG. 13B is a view (part 2) showing the mode.
Figure 13C:
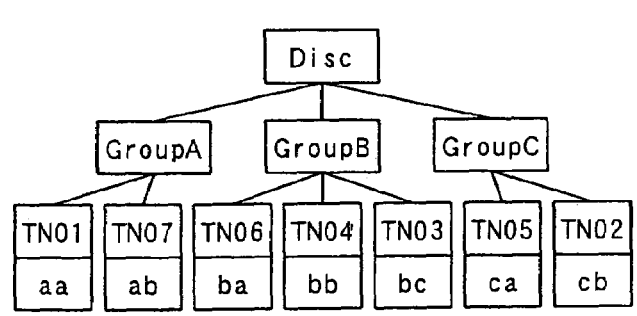
FIG. 13C is a view (part 3) showing the mode.

Description will now be given as to a mode of grouping tracks (songs) with reference to FIGS. 13 and 14. FIGS. 13A to 13D show modes in which the group name information is given to a plurality of songs which are not under group management as shown in FIG. 13A. In this case, the Groups A, B and C are first newly created (FIG. 13B). Then, the Group A is given to a song "aa" (TNO 1) and a song "ab" (TNO 7); the Groups B, a song "ba" (TNO 6), a song "bb" (TNO 4) and a song "bc" (TNO 3); and the Group C, a song "ca" (TNO 5) and a song "cb" (TNO 2), respectively (FIG. 13C).

Figure 13D:
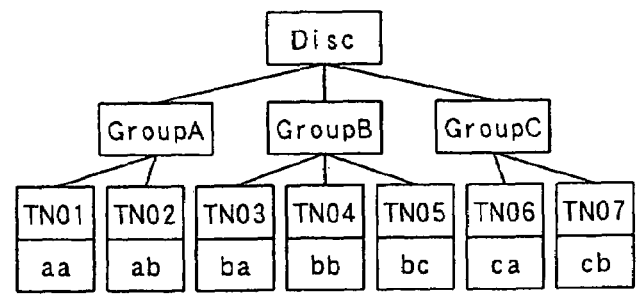
FIG. 13D is a view (part 4) showing the mode.

It is desirable to give the group name information (registration to each group) in accordance with a purpose of grouping. For example, when grouping tracks alphabetically, the group name information such as the Group A, the Group B and Group C is created, and each song is registered in the group in accordance with its song name. Furthermore, as similar to the modes shown in FIGS. 10C and 11B, the ordering rule for songs in the group is previously set, and a logical position in each group to which each song is moved is determined in accordance with the ordering rule. In the example shown in FIG. 13C, the song names are alphabetically ordered. Then, as shown in FIG. 13D, the TNO is re-imparted as the entire Groups A, B and C in accordance with the TNO imparting rule. Incidentally, besides alphabetical grouping, there is a method for grouping in accordance with the Japanese syllabary or each keyword.

Figure 14A:
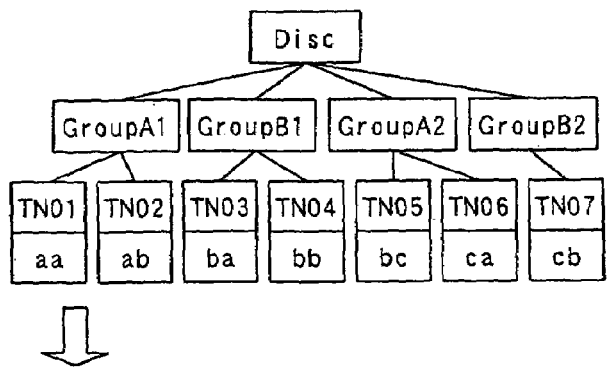
FIG. 14A is a view (part 1) showing the mode when a plurality of groups are integrated into some groups according to the third embodiment of the present invention.
Figure 14B:
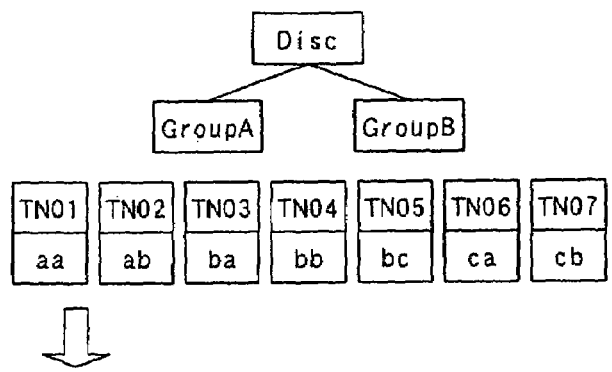
FIG. 14B is a view (part 2) showing the mode.
Figure 14C:
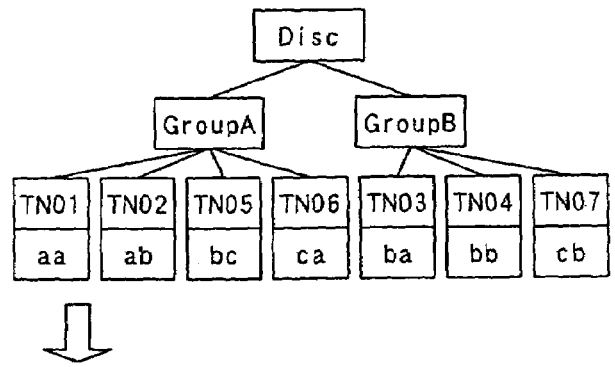
FIG. 14C is a view (part 3) showing the mode.
Figure 14D:
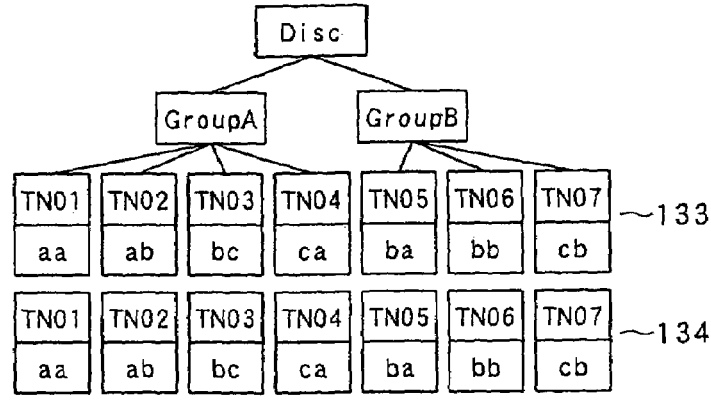
FIG. 14D is a view (part 4) showing the mode.

FIGS. 14A to 14D show a mode for integrating a plurality of groups such as illustrated in FIG. 14A into some groups. In this case, the Group A1 and the Group A2 are integrated into the Group A, and the Group B1 and the Group B2 are integrated into the Group B (FIG. 14B). As a result, the song "aa" (TNO 1), the song "ab" (TNO 2), the song "bc" (TNO 5), the song "ca" (TNO 6) belong to the Group A, and the song "ba" (TNO 3), the song "bb" (TNO 4) and the song "cb" (TNO 7) belong to the Group B (FIG. 14C). Here, as to groups to be integrated, a case where a user selects a plurality of groups or a case where similar names (including the same name) are automatically integrated can be considered. Although integration of two groups is similar to the mode described in connection with FIG. 11B, this mode is effective when a number of groups to be integrated is large as 3 or 4.

A destination logical position in each group is similar to the mode shown in FIG. 13. Further, in this mode, since the TNO imparting rule is satisfied as designated by reference numeral 133 in FIG. 14D, the TNO may not be re-imparted. As designated by reference numeral 134 in FIG. 14D, however, the TNO can be re-imparted as the entire Groups A and B. This shows a mode of movement to a logical position desired by a user. In this mode, a song is specified by designating track number information (this can be substituted by a song name) given to that song.

In the mode of grouping tracks (songs) shown in FIGS. 13 and 14, for example, when dubbing from a CD to an MD without issuing a group management instruction in the initial stage, only the track number information is given to each song. However, when there are may songs which are not under group management, the burden on a user can be reduced by automatically performing grouping.

Figure 15:
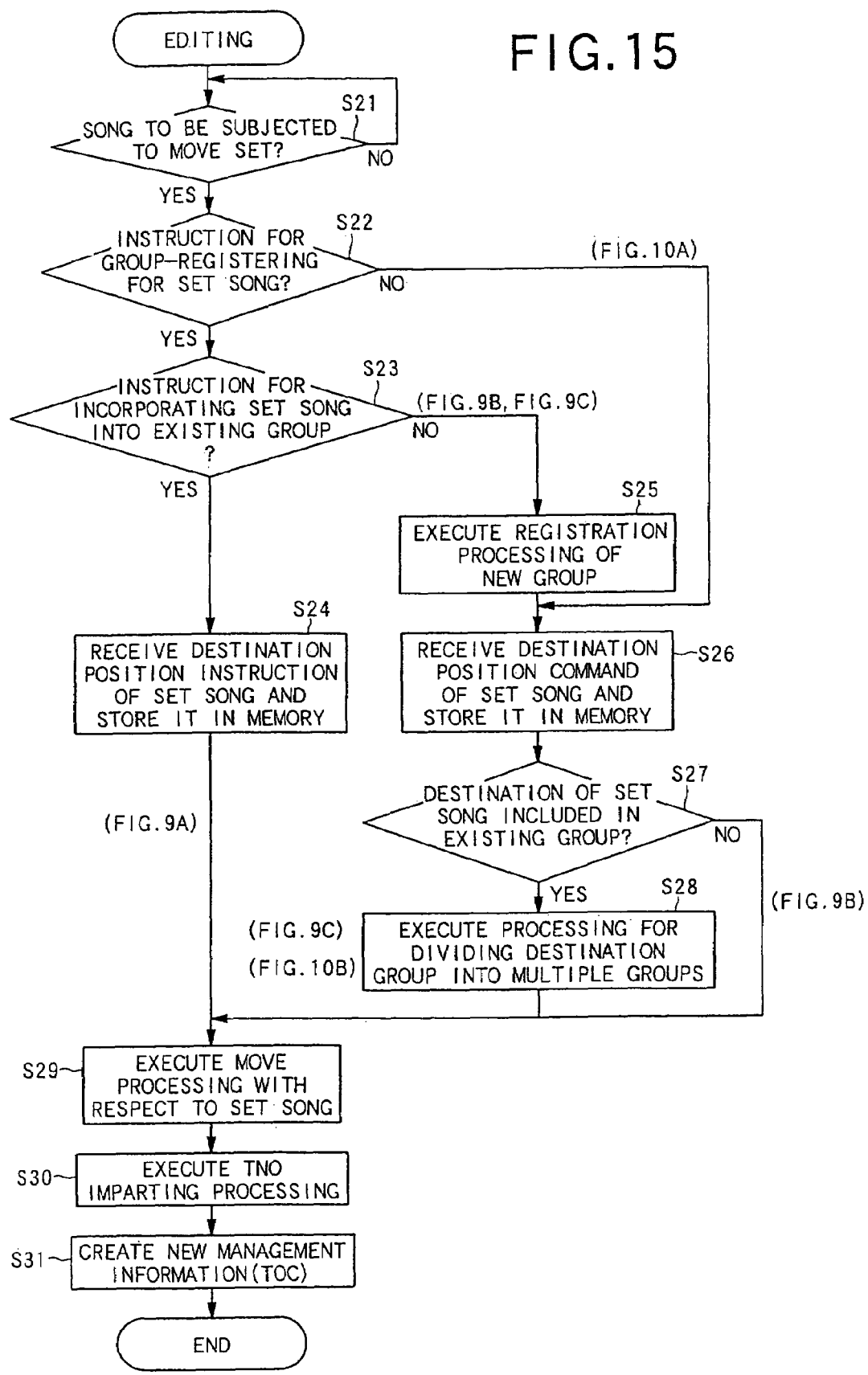
FIG. 15 is a flowchart (part 1) showing a TOC editing processing routine when moving a track (song) according to the third embodiment of the present invention.

Description will now be given as to TOC editing processing by the CPU 51a with reference to FIGS. 15 to 18. FIG. 15 is a flowchart showing a TOC editing processing routine when moving tracks (songs) in FIGS. 9A to 9C and FIGS. 10A and 10B. Incidentally, processing at parts with notation FIGS. 9A to 10B corresponds to processing in the mode shown in each corresponding drawing.

In the TOC editing processing shown in FIG. 15, the CPU 51a first reads the TOC from the magnetic optical disc 20 and temporarily stores it in the RAM 51c. Then, the CPU 51a enters the standby mode to wait for a song movement (MOVE) instruction from the input portion 52 (step S21). In this state, for example, a user sees the display content in the display portion 53 and operates the input unit 52 to set (specify) the TNO (track number information) of a song as a target of MOVE (movement). Then, the CPU 51a recognize it and proceeds to the step S2.

At the step S22, the CPU 51a waits for an instruction from the input unit 52, and determines whether the instruction inputted by the user is an instruction for group-managing the set song. If it is determined that it is the instruction for group management, the CPU 51a advances to the step S23. On the other hand, if it is determined that it is not the instruction for group management, the CPU 51a proceeds to the step S26.

At the step S23, the CPU 51a waits for the instruction from the input unit 52, and determines whether the instruction inputted by the user is an instruction for incorporating (moving) the set song into the existing group. If it is determined that it is the instruction for incorporating (moving) into the existing group, the CPU 51a receives a position (logical position) instruction of a destination of the song from the input unit 52 by the user, stores the destination position in the RAM 51c (step S24), and advances to the step S29. Here, for example, when the first song having the TNO 1 given thereto should be moved to a position after the third song, an instruction is issued in order to change the TON 1 to TON 4. Further, if a screen of the display portion 53 is large, a plurality of song names may be displayed so that movement can be carried out while visually confirming only the song names. At any rate, the moving method differs depending on sizes and types of the device. A common point is that the TNO is changed during movement only when the change is enabled in the system controller of the device, and the information recorded on the disc is not rewritten.

On the other hand, if it is determined that the instruction is not one for incorporation into the existing group, the CPU 51a execute the processing for registering a new group, namely, creates group management information (step S25), and advances to the step S26.

At the step S26, the CPU 51a likewise receives the position instruction of a destination of the song from the input unit 52 by the user, stores the destination position in the RAM 51c (step S26), and proceeds to the step S27.

At the step S27, the CPU 51a determines whether the destination position of the set song is included in the existing group (step S27). If it is determined that it is not included in the existing group, the CPU 51a proceeds to the step S29. On the other hand, if it is determined that it is included in the existing group, the CPU 51a executes the processing for dividing the destination group into a plurality of groups based on the division rule (step S28), and advances to the step S29.

At the step S29, the CPU 51a executes the MOVE (movement) processing with respect to the set song Then, the CPU 51a executes the TNO (track number information) imparting processing (re-imparting) with respect to all the songs as described in connection with FIGS. 9 and 10 (step S30), creates new TOC (step S31), and executes the TOC editing processing.

Figure 16:
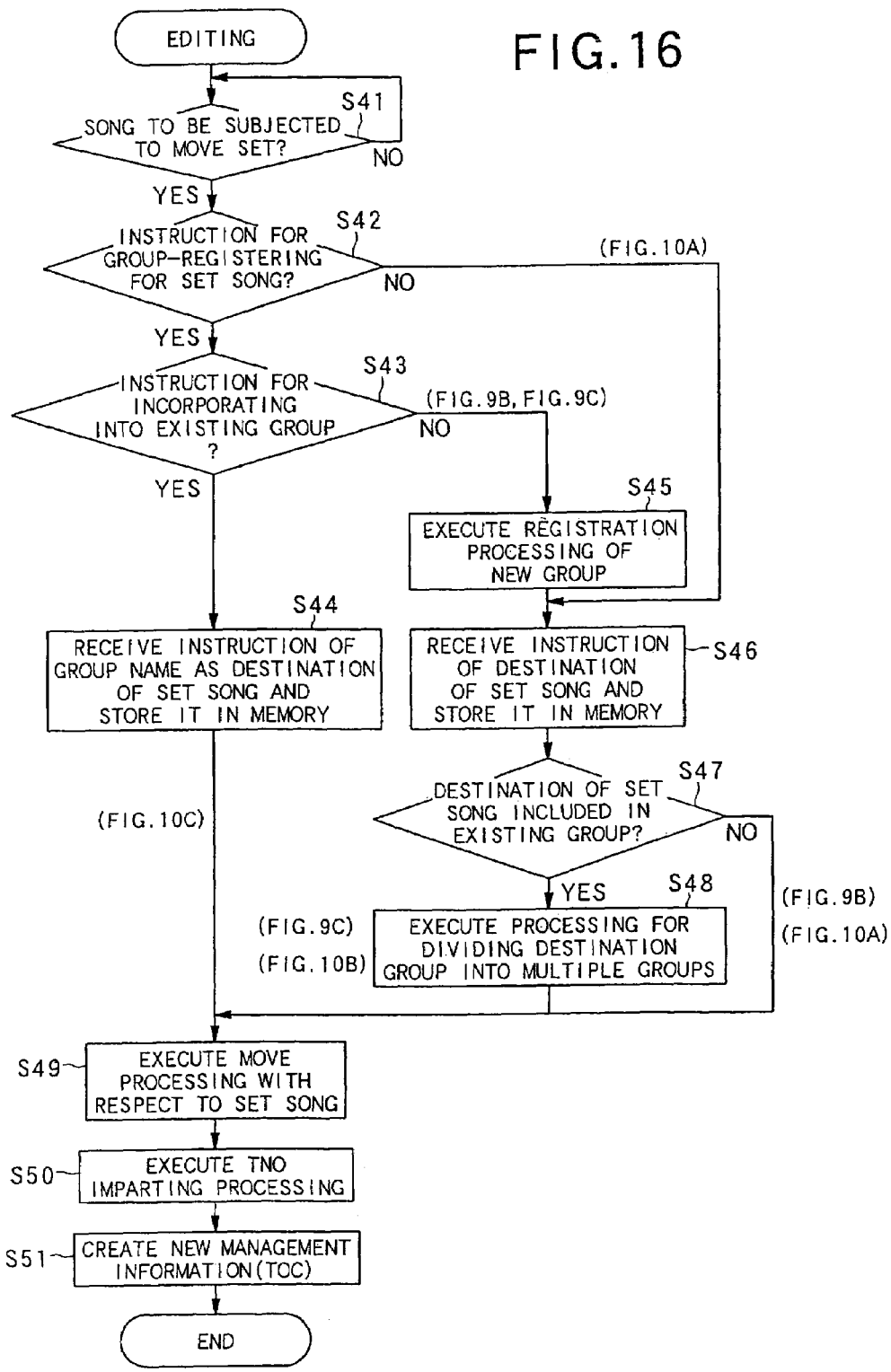
FIG. 16 is a flowchart (part 2) showing the TOC editing processing routine when moving the track (song) according to the third embodiment of the present invention.

FIG. 16 is a flowchart showing the TOC editing processing routine when tracks (songs) are moved in FIGS. 9B to 9C and FIGS. 10A to 10C. Although this flowchart is substantially similar to that illustrated in FIG. 15, the group name information as a destination of a set song is stored in the RAM 51c (step S44) in place of storing a destination position of a set song in the RAM 51c at the step S24 in FIG. 15. That is, when moving a track (song) in FIG. 10C, this processing is executed. At the step S44, a user must input the group name information of a destination of a set song from the input unit 52. Incidentally, a rule for ordering songs in the group is previously set and a logical position in the group to which the song is moved is determined in accordance with the ordering rule, as mentioned above.

Figure 17:
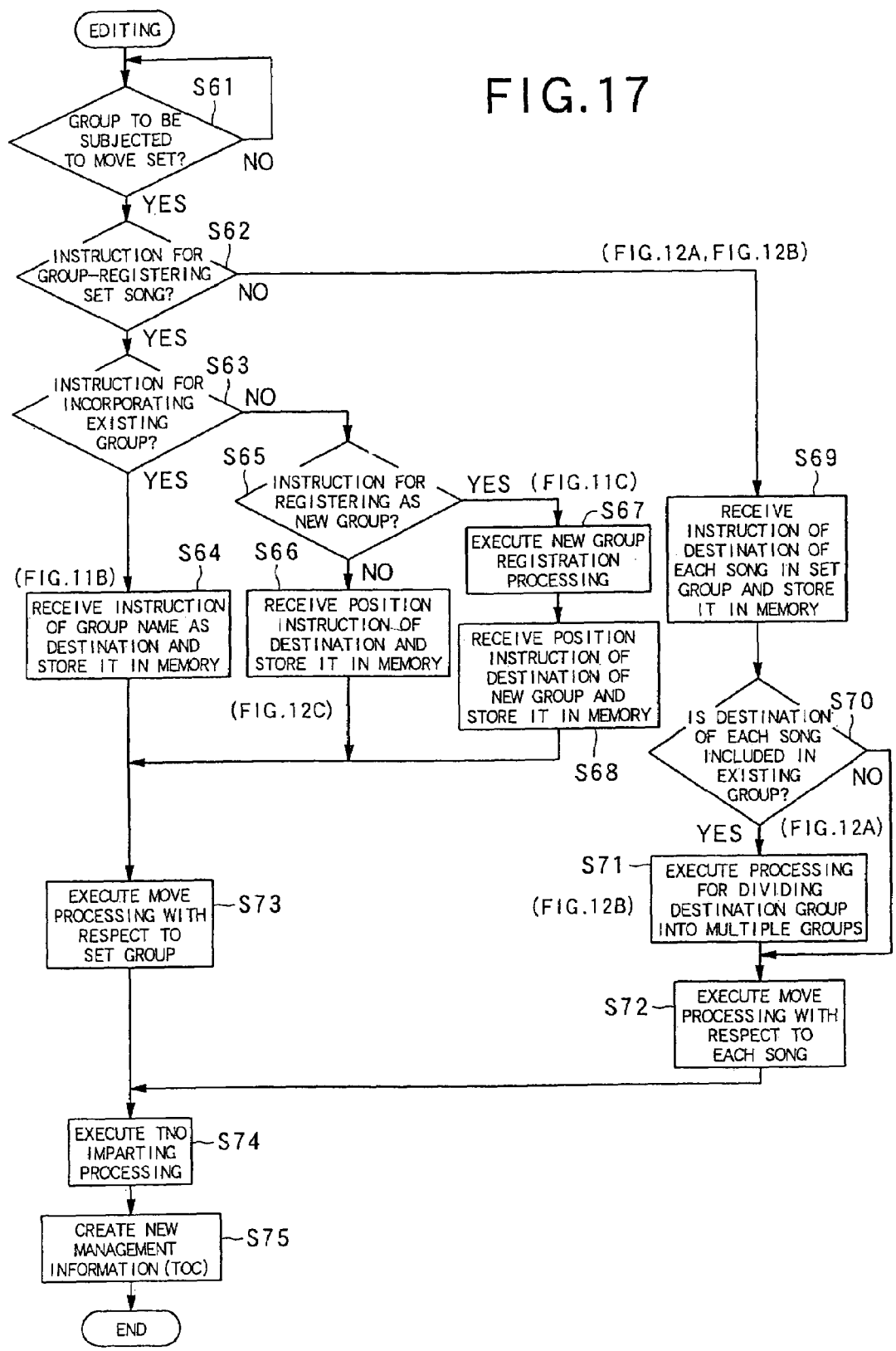
FIG. 17 is a flowchart (part 3) showing the TOC editing processing routine when moving the track (song) according to the third embodiment of the present invention.

FIG. 17 is a flowchart showing the TOC editing processing routine when moving a track (song) in FIGS. 11B and 11C and FIGS. 12A to 12C. It is to be noted that the processing at parts with notation FIGS. 11B to 12C corresponds to the processing in the mode in each corresponding drawing.

In the TOC editing processing shown in FIG. 17, the CPU 51a first reads the TOC from the magnetic optical disc 20 and temporarily stores it in the RAM 51c. Then, the CPU 51a reads the TOC from the magnetic optical disc 20 and temporarily stores it in the RAM 51c. Subsequently, the CPU 51a enters the standby mode to wait for a group movement (MOVE) instruction (step S61). In this state, for example, a user sees the display content in the display portion 53 and operates the input portion 52 to set (specify) the group name information for MOVE (movement). Then, the CPU 51a recognizes it and proceeds to the step S62.

At the step S62, the CPU 51a waits for an instruction from the input unit 52 and determines whether the instruction inputted by the user is an instruction for group-managing songs belonging to the set group. If it is determined that it is the instruction for group management, the CPU 51a advances to the step S63.

At the step S63, the CPU 51*a* waits for an instruction from the input unit 52, and determines whether the instruction inputted by a user is an instruction for incorporating a song belonging to the set group into an existing group. If it is determined that it is the instruction for incorporating into the existing group, the CPU 51*a* further receives an instruction of a destination group from the input portion 52 by the user, stores its group name information in the RAM 51*c* (step S64), and proceeds to the step S73. On the other hand, if it is determined that it is not the instruction for incorporating into the existing group, the CPU 51*a* waits for an instruction from the input portion 52, and determines whether the instruction inputted by the user is an instruction for registering a song belonging to the set group as a new group (step S65). If it is determined that it is not the instruction for registering as a new group, the CPU 51*a* further receives a destination position instruction of the set group from the input portion 52 by the user, stores its group name information in the RAM 51*c* (step S66), and advances to the step S73.

On the other hand, at the step S65, if it is determined that it is the instruction for registering as a new group, the CPU 51*a* executes the new group registration processing, namely, creates the group management information (step S67). Then, the CPU 51*a* receives a destination position instruction of the new group from the input portion 52 by the user, stores its group management information in the RAM 51*c* (step S68), and proceeds to the step S73.

At the step S73, the MOVE (movement) processing is executed to the set group or the new group, thereafter advancing to the step S74.

On the other hand, if it is determined that it is not the instruction for performing group management, the CPU 51*a* receives a destination position instruction for each song belonging to the set group, and stores each position in the RAM 51*a* (step S69). Furthermore, the CPU 51*a* determines whether a destination position of each song is included in the existing group (step S70). If it is determined that it is not included in the existing group, the CPU 51*a* proceeds to the step S72. On the other hand, if it is determined that it is included in the existing group, the CPU 51*a* executes processing for dividing the destination group into a plurality of groups based on the division rule (step S71). Then the CPU 51*a* executes the MOVE (movement) processing with respect to each song, and proceeds to the step S74.

At the step S74, the CPU 51*a* executes the TNO (track number information) imparting processing (re-imparting) with respect to all the songs, creates new TOC (step S75) and terminates the TOC editing processing.

Figure 18:
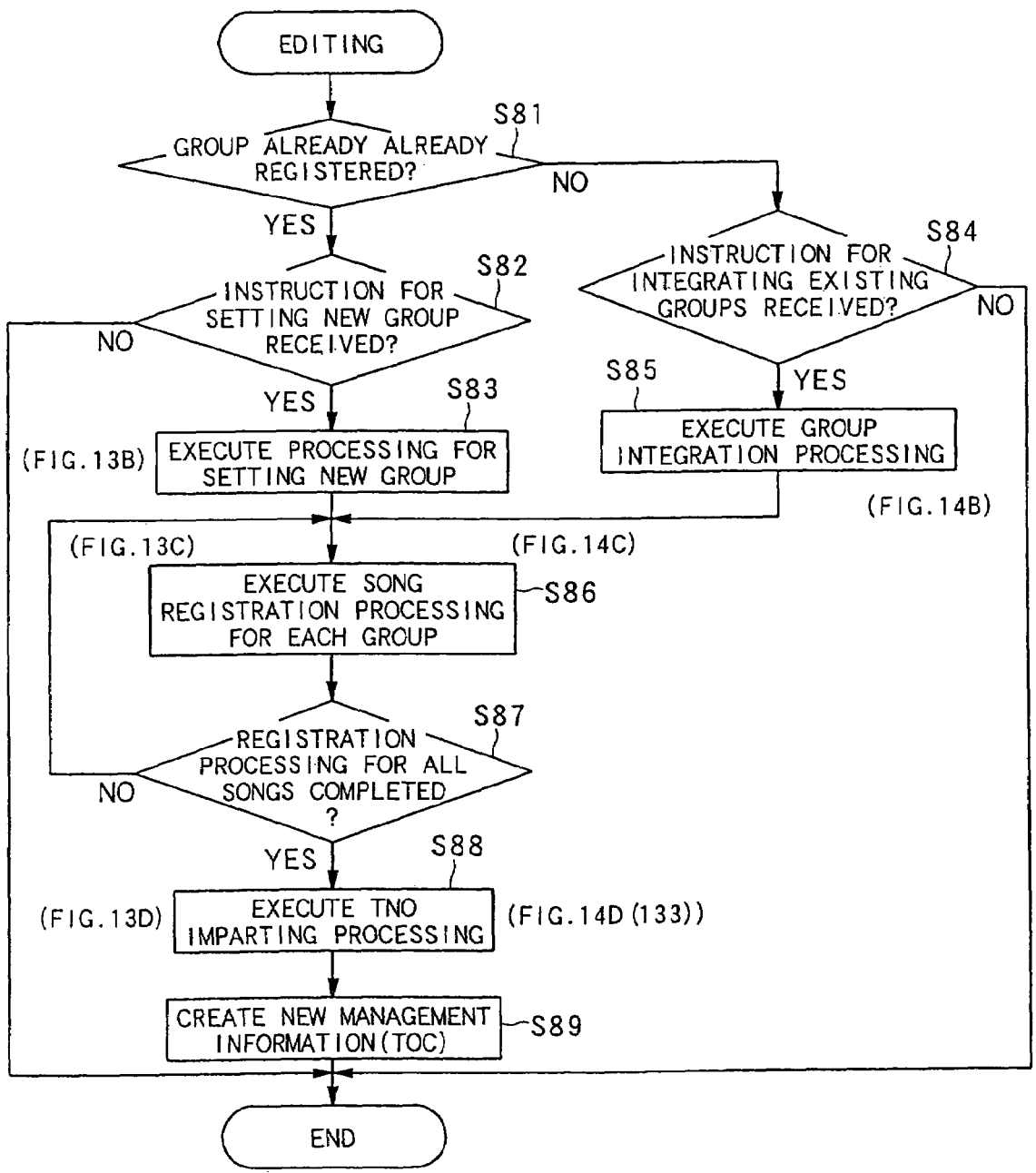
FIG. 18 is a flowchart showing the TOC editing processing routine when grouping tracks (songs) according to the third embodiment of the present invention.

FIG. 18 is a flowchart showing the TOC editing processing routine when performing grouping of tracks (songs) in FIGS. 13 and 14. Incidentally, in FIG. 18, processing at parts with notation FIGS. 13B to 13D and FIGS. 14B to 14D means processing in the mode in each corresponding drawings. Additionally, in FIG. 18, processing at a part with notation FIG. 14D (133) means processing in the mode denoted by reference numeral 133 in FIG. 14D.

In the TOC editing processing illustrated in FIG. 18, the CPU 51*a* first determines whether the group (group management information) has been already registered in the TOC (step S81). If it is determined that the group has been already registered, the CPU 51*a* advances to the step S82. On the other hand, if it is determined that the group has not been registered, the CPU 51*a* proceeds to the step S84.

At the step S82, the CPU 51*a* waits for an instruction from the input unit 52 and determines whether the inputted instruction is an instruction for registering a new group. If it is determined that it is the instruction for registering the new group, the CPU 51*a* executes the new group registration processing (step S83) and advances to the step S86. On the other hand, if it is determined that it is not the instruction for registering the new group, the CPU 51*a* terminates the TOC editing processing.

At the step S84, the CPU 51*a* waits for an instruction from the input unit 52 and determines whether the inputted instruction is an instruction for integrating the existing groups. If it is determined that it is the instruction for integrating the existing groups, the CPU 51*a* executes the group integration processing (step S85) and advances to the step S86. On the other hand, if it is determined that it is not the instruction for integrating the existing groups, the CPU 51*a* terminates the TOC editing processing.

At the step S86, the processing for registering songs to each group is executed, namely, the group management information is created. Judgment in made upon whether the registration processing for all the songs is completed (step S87). If the processing for registering all the songs is completed, the CPU 51*a* executes the TNO (track number information) imparting processing (re-imparting) (step S88), creates new TOC (step S89) and terminates the TOC editing processing.

Incidentally, in FIGS. 15 to 18, various instructions from the input portion 52 collectively mean the editing instruction.

As described above, according to this embodiment, by determining the TON imparting rule, the ordering rule, the division rule or the correspondence relationship between the track number information and the group management information, the track number information can be automatically imparted or changed, the order of songs can be changed or the group can be divided so as to satisfy any other rule or the like when editing the reproduction order of songs or editing the registration (allocation) to the group, thereby reducing the operation loads to a user.

(Fourth Embodiment)

Figure 19:
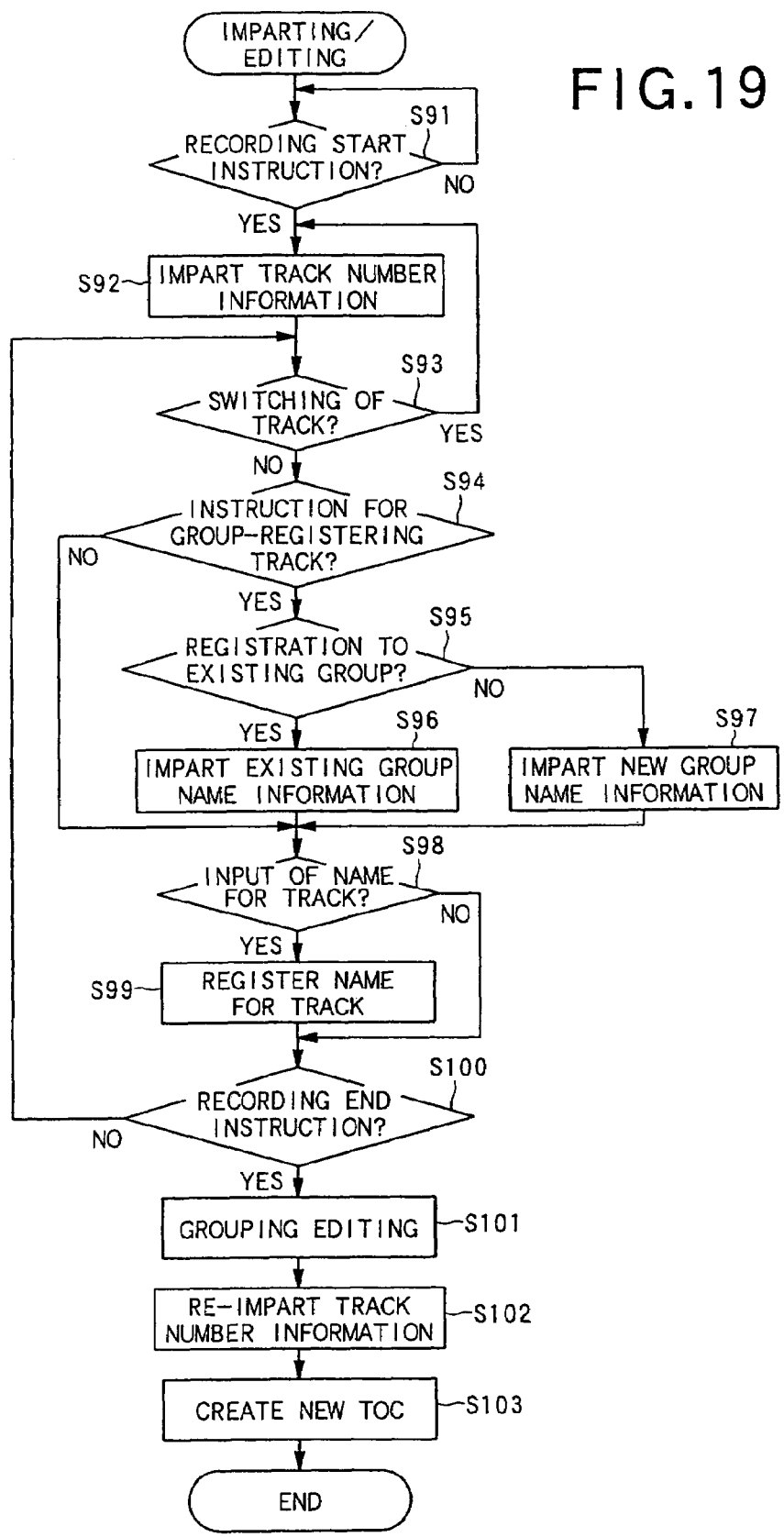
FIG. 19 is a flowchart showing a TOC giving/editing processing routine according to a fourth embodiment of the present invention.

A fourth embodiment according to the present invention will now be described with reference to FIGS. 19 and 20. It is to be noted that like reference numerals denote parts common to the first embodiment, thereby omitting their explanation.

In this embodiment, the information recording device according to the present invention is applied to the magnetic optical disc recording/reproducing device mentioned above. The CPU 51*a* according to this embodiment has a function as information imparting device in the present invention. When recording information onto the magnetic optical disc 20, this function executes the processing for imparting the TOC to the track or editing the imparted TOC (TOC imparting/editing processing). Further, the TOC is recorded at the innermost circumference part of the magnetic optical disc when the magnetic optical disc 20 is taken out from the magnetic optical disc recording/reproducing device 100. A TOC imparting/editing processing program or the like is stored in the ROM 51*b*.

In the magnetic optical disc recording/reproducing device as the information recording device according to this embodiment having such a structure as shown in FIG. 1, at the time of the information recording operation of the magnetic optical disc recording/reproducing device 100, an input signal (for example, a song reproduced from a CD reproducing device, or AM or FM broadcast) inputted to the input portion 14 is supplied to the data compression encoder/decoder 13, and the data compression encoding processing is performed. Then, based on an instruction of the system controller 10, its song data is temporarily written in the DRAM by the DRAM control circuit 11. Furthermore, with a predetermined timing, the song data is read and supplied to the EFM encoder/decoder 9, and the encoding processing such as EFM modulation is performed by the EFM encoder/decoder 9. Then, the processed data is supplied to the head drive circuit 5. Moreover, a magnetic head drive signal is supplied to the magnetic head 3 by the head drive circuit 5 in accordance with the compression data subjected to the encoding processing. At the same time, an output of the laser diode of the optical pickup 2 is increased and the magnetic film of the magnetic optical disc 20 is heated to the Curie temperature or a high temperature, thereby recording the song data on the magnetic optical disc 20. In addition, at this moment, the servo control circuit 8 carries out the servo control based on an instruction from the system controller 51.

When the information (song) is recorded on the magnetic optical disc 20, the system controller 51 executes the TOC imparting/editing processing which is a characteristic part of the present invention. The TOC imparting/editing processing will now be described in detail hereinafter.

In this embodiment, it is assumed that the group management information is included in the TOC as shown in FIG. 2B.

In the example of FIG. 2B, the Group A and the Group B are registered in one Disc. Additionally, a song "a" having the TON 1 imparted thereto, a song "b" having the TON 2 imparted thereto and a song "c" having the TON 3 imparted thereto belong to the Group A, and a song "d" having the TON 4 imparted thereto and a song "e" having the TON 5 imparted thereto belong to the Group B. As described above, in the TOC according to this embodiment, recorded songs are grouped and managed (which will be referred to as "group management" hereinafter). According to such group management, for example, in case of reproduction, when a user specifies one song through the input unit 52, he/she can perform narrowing-down specification. For example, the user can first specify the Group A and then specify the TON 1 as the track number information belonging to the Group A. Furthermore, in case of reproducing such a disc, when a special reproduction method such as program reproduction or random reproduction is not specified, songs are reproduced in the order of the track number information (from a small number toward the larger numbers).

Moreover, in the TOC imparting/editing processing, every time one track (song) is recorded, the track number information or the group name information can be imparted to that track. In addition, after imparting the track number information or the group name information, the track number information can be automatically changed or editing for grouping can be carried out.

Here, in the TOC imparting editing processing, when changing the track number information, there is determined the rule for imparting the track number information (which will be referred to as the "TNO imparting rule" hereinafter), i.e., i) the same track number information is not used for different groups, and ii) the track number information for each group has the continuity increasing from the first number to the last number and a vacant number is admitted.

Description will now be given as to the TOC imparting/editing processing when, for example, a song outputted from the CD reproducing device and inputted to the magnetic optical disc recording/reproducing device 100 is dubbed to the magnetic optical disc 20 with reference to FIGS. 19 and 20. FIG. 19 is a flowchart showing the TOC imparting editing processing routine. FIG. 20 show examples illustrating how the logical structure of the TOC is changed in the TOC imparting editing processing.

When a user first operates the input unit 52 and inputs a recording instruction, the CPU 51a recognizes it (step S91), starts information recording control of each constituent part of the magnetic optical disc recording/reproducing device 100, reads the TOC from the magnetic optical disc 20 and temporarily stores it in the RAM 51c. Then, when a song outputted from the CD reproducing device is inputted to the DRAM control circuit 11 through the input portion 14 and the data compression encoder/decoder, the CPU 51a recognizes it, imparts the track number information to that song (track) (step S92), stores it in the RAM 51c and proceeds to the step S93.

At the step S93, the CPU 51a determines whether there is switching (changing) of songs (tracks). That is, it determines whether the inputted song is switched to a next song. Although this is carried out by detecting a change in the track number outputted from the CD reproducing device or detecting a predetermined unoccupied time between songs, a user may input a switching instruction. When it is determined that there is no switching, the CPU 51a proceeds to the step S94. On the other hand, when it is determined that there is switching, the track number information is given to that song (track).

At the step S94, the CPU 51a determines whether there is a group registration instruction from the input unit 52 by a user to a song (track) which is in the recording process. When a user inputs this group registration instruction from the input unit 52, he/she specifies either the group name information already existing in the TOC (which will be referred to as the "existing group name information" hereinafter) or the new (set in the ROM 51b or the like in advance) group name information (which will be referred to as the "new group name information" hereinafter). As to this specification, for example, in case of the existing group name information, the existing group name information is displayed in the display unit 53 so that it can be selected by the input unit 52. In case of the new group name information, the new group name information can be inputted from the input unit 52. Incidentally, in case of specification of the new group name information, for example, numerical figures such as ten keys of the input unit 52 may be given as the new group name information for the meantime, and these figures may be changed to a genre name or the like after recording.

If it is determined that there is the group registration instruction at the step S94, the CPU 51a advances to the step S95. On the other hand, if it is determined that there is no group registration instruction, the CPU 51a proceeds to the step S98.

At the step S95, the CPU 51a determines whether registration to the existing group, namely, the existing group name information is specified. If it is determined that registration to the existing group is specified, the CPU 51a imparts the specified existing group name information to that song (track) (step S96) and stores it in the RAM 51c. As a result, a user can collectively manage the newly recorded song (track) and the already recorded song (track) after recording. On the other hand, if it is determined that registration to the existing group is not specified, the CPU 51a imparts the new group name information to that song (track) (step S97) and stores it in the RAM 51c. As a result, a user can manage the newly recorded song (track) and the already recorded song (track) separately from each other.

Then, when a user inputs a name for the song (track) which is being recorded by operating the input unit 52, the CPU 51a recognizes it (step S98) and registers the name with respect to that song (track) (step S99).

Subsequently, the CPU 51a repeatedly executes the processing at the steps S92 to S99 until it receives a recording termination instruction from the input portion 52 or a recording termination instruction by program recording (step S100). That is, as described above, every time the song (track) is switched, the track number information is automatically imparted, and the group name information is arbitrarily given by a user. FIG. 20A shows an example of the logical structure of the TOC after the track number information and the group name information are given to songs (tracks). In the example of FIG. 20A, songs are recorded from the left side toward the right side, and the track number information (TON 1, TON 2, . . . ) is given to each song (track) in the order of recording. Further, the group name information (Group 3, Group 2, . . . ) is given to each song (track).

Subsequently, at the step S101, the CPU 51a carries out grouping editing in such a manner that songs (tracks) having the same imparted group information form one group. FIG. 20B shows an example of the logical structure of the TOC after grouping editing. In the example of FIG. 20B, grouping editing is carried out in the order of Group 1, Group 2 and Group 3. For instance, a song "bb" (TON 4), a song "ba" (TON 6) and a song "ab" (TON 7) belong to the Group 1. Furthermore, the order of recorded songs is changed by this grouping editing (the order of TON 1, TON 2, . . . is changed to the order of TON 4, TON 6, . . . ). Moreover, in grouping editing, the order of groups can be arbitrarily set by a user from the input portion 52 (for example, it can be set to the alphabetic order). In addition, if the track number information given to each song remains the initial state, when reproducing in the order of track numbers (without specifying a special reproduction method), groups are reproduced in disorder.

Subsequently, at the step S102, the CPU 51a changes the track number information given to each song (track) based on this grouping editing (step S102). That is, the CPU 51a re-imparts the track number information to all the songs (tracks) based on the TNO imparting rule. FIG. 20C shows an example of the logical structure of the TOC after re-imparting the track number information. As shown in FIG. 20C, the track number information is given in the order of songs (tracks) after change by grouping editing. In this manner, new TOC is created by the CPU 51a (step S103), and this is eventually recorded at the innermost circumference part of the optical disc 20.

As mentioned above, according to this embodiment, the track number information and the group name information can be easily imparted every time one song is dubbed. Upon completion of dubbing, songs can be collected for each group and grouped, and the track number information can be automatically re-imparted based on this grouping. Therefore, a user does not need to determine the order of songs to be recorded in advance when dubbing Accordingly, editing is automatically carried out in the desired order of songs even if a user has recorded songs in any order, thereby reducing the operation loads to the user.

Additionally, a user can arbitrarily edit the TOC created in the above-described manner after recording. For example, movement or reshuffle of the group name information or the track number information is possible. Therefore, since the reproduction order in units of genre or the reproduction order of songs can be easily changed, thus efficiently managing the songs.

Incidentally, above has described the case where the information displaying/reproducing device, the information editing device and the information recording device according to the present invention are applied to the magnetic optical disc recording/reproducing device in each of the foregoing embodiments. However, they can be applied to a recording/reproducing device for an information storage medium such as an MD, a CD, a DVD or an LD, or an all-in-one audio device capable of using a plurality of such information storage mediums, or an in-vehicle audio device.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosures of Japanese Patent Application No. 2000-357767 filed on Nov. 24, 2000, Japanese Patent Application No. 2000-357768 filed on Nov. 24, 2000, Japanese Patent Application No. 2000-357770 filed on Nov. 24, 2000, and Japanese Patent Application No. 2000-357771 filed on Nov. 24, 2000 including the specification, claims, diagrams and summary is incorporated herein by reference in its entirety.

What is claimed is:

1. An information recording apparatus comprising an information imparting device for imparting track number information in accordance with each track to be recorded on an information storage medium and group information included in group management information for managing one or a plurality of tracks as one group, wherein every time one track is recorded on said information storage medium, said information imparting device imparts group information to said track, wherein said apparatus further comprises a group information specifying device for specifying said group information in accordance with a user's instruction during the recording of said track, wherein said information imparting device imparts the group information specified by the group information specifying device to said track, and wherein the group management information ad the track number information are located in a TOC (table of contents) portion of the information storage medium.

2. The information recording apparatus according to claim 1, wherein every time said one track is recorded, said group information imparted to said track is group information of a group which already exists on said information storage medium.

3. The information recording apparatus according to claim 1, wherein every time said one track is recorded, said group information imparted to said track is group information of a new group.

4. The information recording apparatus according to claim 1, wherein every time said one track is recorded, track number information is imparted to said track.

5. The information recording apparatus according to claim 4, wherein every time said one track is recorded, group information and track number information are imparted to said track, and thereafter track number information imparted to each track is changed by utilizing said imparted group information.

6. The information recording apparatus according to claim 4, wherein every time said one track is recorded, group information and track number information are imparted to said track, grouping editing is then carried out so that tracks having the same imparted group information form one group, and track number information imparted to each track is changed based on said editing.

7. The information recording apparatus according to claim 5, wherein said apparatus further comprises an order setting device for setting an order of said group information, wherein said track number information imparted to each track is changed in accordance with said order of said group information, and wherein the group management information and the track number information are located in a TOC (table of contents) portion of the information storage medium.

* * * * *